(12) United States Patent
Harding et al.

(10) Patent No.: US 12,481,468 B2
(45) Date of Patent: Nov. 25, 2025

(54) SYSTEMS AND METHODS FOR COMBINING AND SYNCHRONIZING DISPLAY CONTENT OF DISPARATE DISPLAY CONTENT GENERATORS

(71) Applicant: Twinit Limited, Dublin (IE)

(72) Inventors: John Harding, Ann Arbor, MI (US); Anand Mecheri, Dublin (IE)

(73) Assignee: Twinit Limited, Dublin (IE)

( * ) Notice: Subject to any disclaimer, the term of this patent is extended or adjusted under 35 U.S.C. 154(b) by 217 days.

(21) Appl. No.: 18/355,847

(22) Filed: Jul. 20, 2023

(65) Prior Publication Data

US 2024/0028283 A1 Jan. 25, 2024

Related U.S. Application Data

(60) Provisional application No. 63/390,783, filed on Jul. 20, 2022.

(51) Int. Cl.
  *G06F 3/14* (2006.01)
  *G06T 11/00* (2006.01)
  *G06T 15/04* (2011.01)

(52) U.S. Cl.
  CPC .............. *G06F 3/14* (2013.01); *G06T 11/001* (2013.01); *G06T 15/04* (2013.01)

(58) Field of Classification Search
  CPC .......... G06F 3/14; G06T 11/101; G06T 15/04
  See application file for complete search history.

(56) References Cited

U.S. PATENT DOCUMENTS

| | | | |
|---|---|---|---|
| 2011/0283223 A1* | 11/2011 | Vaittinen | G06F 3/04815 715/781 |
| 2011/0288322 A1 | 11/2011 | Vaittinen et al. | |
| 2013/0162755 A1* | 6/2013 | Swanson | H04N 7/155 709/205 |
| 2014/0108665 A1* | 4/2014 | Arora | H04L 67/563 709/227 |
| 2017/0205885 A1* | 7/2017 | Schpok | G01C 21/26 |
| 2024/0147017 A1* | 5/2024 | Mendell | H04N 21/6547 |

OTHER PUBLICATIONS

PCT/US23/70618—International Search Report and Written Opinion, mailed Dec. 7, 2023, 12 pages.
European Patent Application No. 23843893.1, Extended European Search Report mailed Sep. 25, 2025, 8 pages.

* cited by examiner

*Primary Examiner* — Kee M Tung
*Assistant Examiner* — Khoa Vu
(74) *Attorney, Agent, or Firm* — Conley Rose, P.C.

(57) ABSTRACT

According to aspects of the disclosed subject matter, a multi-view framework (MVF) is presented. Advantageously and according to aspects of the disclosed subject matter, an MVF operates as an executable service and provides a single user experience (UX) and application programming interface (API) for concurrent viewing and interaction with two or more digital twins, each digital twin being generated by a third-party content display generator unrelated to the MVF and other content display generators providing display content to the MVF for concurrent display. Still further, an MVF may be advantageously incorporated into a consumer software package and/or packaged as a consumer software package or provided as an online service.

19 Claims, 17 Drawing Sheets

SYSTEMS AND METHODS FOR COMBINING AND SYNCHRONIZING DISPLAY CONTENT OF DISPARATE DISPLAY CONTENT GENERATORS

CROSS-REFERENCE TO RELATED APPLICATIONS

This application also claims priority to U.S. Provisional Patent Application No. 63/390,783, filed Jul. 20, 2022, titled "Method for Combining Independent Digital Model Viewers into a Unified Component and Allowing Synchronization of Multiple Views," the entirety of which is incorporated herein by reference.

BACKGROUND OF THE INVENTION

Many technical professions use a wide array of software packages to create, view, and manipulate various views or viewpoints of a real-world asset. These views are referred to as digital twins: i.e., digital representations of the same real-world asset. A real-world asset may be large in scale (i.e., a city) or small (i.e., an item of furniture) or anywhere in between (e.g., neighborhoods, buildings, floors, rooms, HVAC (heating, ventilation and air conditioning) systems, electrical systems, etc.) An example would be a city planner looking at the land use of a city and being able to "drill down" into immersive 3D content to show specifics of building design. Another illustrative example might be an owner of a portfolio of buildings wishing to see their one or more of their buildings in a GIS application, and subsequently selecting individual buildings to interact with their BIM (building information model) representations at the mechanical asset level (i.e., HVAC etc.).

In addition to technical applications of the various software packages, many consumer-focused applications of content viewers require similar concurrent presentation of alternative views of digital twins. By way of example, a visitor may utilize a tourism application that offers an overview of a city using a GIS (geographic information system) software package. The visitor may further want to choose a district of the city (e.g., a "Theater District") and then they may want to explore the streets of that city via an immersive, realistic view of streets with traffic and people, street furniture, advertising billboards, etc. Still further, the visitor may want to explore (via a software package) the inside a particular hotel to check out its décor, ambiance, facilities, etc. before making any booking.

Often, as illustrated in the above examples, a person is forced to using a software package to view an overarching model (e.g., a city) and another software package to view a finer level of detail within the overarching model, one able to further depict intricacies of individual objects within the overarching model (e.g., a building's exterior or interior, or features and assets within the building). Typically, each given level of detail corresponds to display content served by a software package fronting a display content generator. Moreover, these display content generators (via their corresponding software packages) are and operate independently from one another. Thus, the user wanting to concurrently view digital twins at distinct levels is required to switch software applications/display content generator.

SUMMARY OF THE INVENTION

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, a multi-view framework (MVF) is presented. Advantageously and according to aspects of the disclosed subject matter, an MVF operates as an executable service and provides a single user experience (UX) and application programming interface (API) for concurrent viewing and interaction with two or more digital twins, each digital twin being generated by a third-party content display generator unrelated to the MVF and other content display generators providing display content to the MVF for concurrent display. Still further, an MVF may be advantageously incorporated into a consumer software package and/or packaged as a consumer software package or provided as an online service.

In accordance with aspects of the disclosed subject matter, a method for operating a display framework is presented. The method, as implemented on a computing device and displaying content on a computer display comprises the following. First display content corresponding to a location value is obtained from a first display content generator. In response, the first display content is displayed in a first view on the computer display. Second display content corresponding to the location value is obtained from a second display content generator. In response, the second display content is displayed by the display framework in a second view on the computer display. In various embodiments, the first view and the second view are displayed concurrently on the computer display. Further, the first display content generator and the second content generator are third-party services to the display framework. In furtherance of the method and in response to receiving an update to the location value, the updated location value is communicated by the display framework to both the first content generator and the second content generator. Further in response to receiving the update to the location value, updated first display content corresponding to the updated location value is received from the first display content generator and displayed in the first view on the computer display. Similarly, updated second display content corresponding to the updated location value is received from the second display content generator and displayed in the second view on the computer display concurrently with the first view.

According to further aspects of the disclosed subject matter, a computer system is present, which includes a processor that executes computer-executable instructions and a computer display that is configured to display one or more views in a viewer window. The computer system also includes an executable multi-modal framework (MVF). In execution on the computer system, is configured to carry out the following operations, including receiving an instruction to display content from a first data source unrelated to the MVF, wherein the content is based on a first location. In response to the received instruction, a first bridge component is identified, the first bridge component being suitably configured to interface with the first data source at the direction of the MVF and cause the first bridge component to communicate location data, including the first location, to the first data source. In response, the first bridge component, on behalf of the MVF, obtains first display content from the first data source based on the first location. The obtained first display content is presented in a first view in the viewer window of the computer display. The MVF receives updated location information corresponding to a second location. In response to the updated location information, the MVF causes the first bridge component to communication location data including the second location to the first data source. Via the first bridge, the MVF the obtains second display content from the first data source based on the second location and present the second display content from the first data source in the first view of the computer display, wherein the second display content corresponds to the second location.

BRIEF DESCRIPTION OF DRAWINGS

The foregoing aspects and many of the attendant advantages of the disclosed subject matter will become more readily appreciated as they are better understood by reference to the following description when taken in conjunction with the following drawings, wherein.

Figure 1:
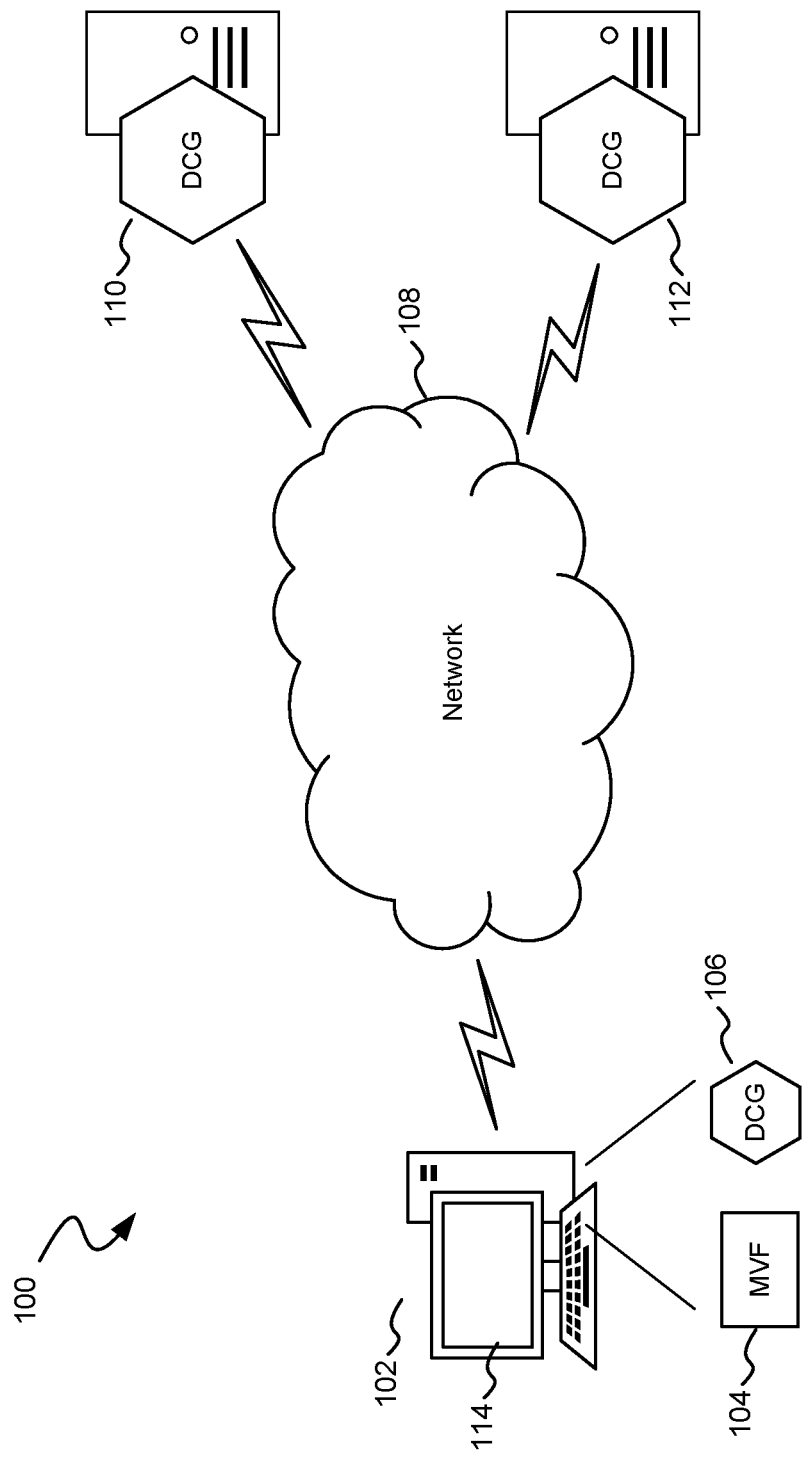
FIG. 1 is a block diagram illustrating an exemplary computer environment suitable for implementing aspects of the disclosed subject matter.

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there are multiple instances of the term/item. For example, the term "user(s)" should be interpreted as one or more users. Further still, the term "and/or" should be construed as being a non-exclusive or (i.e., one or the other(s), or all).

As indicated above and according to aspects of the disclosed subject matter, a multi-view framework (MVF) is presented. Advantageously, an MVF provides a single user experience (UX) and application programming interface (API) for concurrent viewing and interaction with two or more digital twins, each digital twin being generated by a third-party content display generator unrelated to the MVF and other content display generators providing display content to the MVF for concurrent display. Advantageously, aspects of the disclosed subject matter combine disparate viewers (often from disparate, third-party sources) into a unified component. Indeed, the MVF leverages the existing web viewers (i.e., display content generators) of native applications and wraps them in a bridge for the MVF such that a user can access the third-party content with a common API.

Advantageously, a common API allows an application developer to synchronize location information and updates across views (e.g., an inset map in a geographic information system or "GIS" viewer could track the user's avatar movement in a virtual world implemented with a Game Engine viewer). Further, the common API reduces the workload for a given application developer. For example, in the above example, a developer needs learn only one common API, that of the MVF, rather than the API for the GIS viewer and the API for the Game Engine viewer. In addition to the advantages of a common UI, the disclosed subject matter also facilitates a developer to create a seamless UX for the end user. Indeed, rather than having to switch between applications or pages within the same application, the application developer can fashion a smooth transition with a common set of controls regardless of the underlying native view.

While many of the examples described in this document are made with regard to locations of cities and buildings, this invention is not limited to these examples. By way of illustration and without limitation, anything for which a digital model exists, e.g., factories, automobiles, consumer products etc., may be incorporated into the MVF. Indeed, the disclosed subject matter is suitable in most any situation where there are different views of the same model from disparate content generating sources, as the MVF provides a modular framework to add as many additional viewing modes as needed through the use of bridges.

Turning to FIG. 1, this figure is a block diagram illustrating an exemplary computer environment 100 suitable for implementing aspects of the disclosed subject matter. More particularly, this figure illustrates the environment in which a suitably configured computer system 102 (as illustratively described below in regard to FIG. 9) executes and/or implements an MVF 104. Indeed, the MVF on the computing system interacts with other services, each referred to as a display content generator (DCG), to present a single UX to the user of the computer system in viewing and interacting with synchronized views of related data from disparate DCGs, all or some of which are third-party services to the MVF.

Regarding the DCGs, a display content generator may be hosted and operate locally on the computer system 102, as is the case with DCG 106, and/or be hosted remotely over a network 110 as online services, as illustrated with DCGs 110 and 112. As will be discussed in greater details below with respect to FIG. 2, and in accordance with aspects of the disclosed subject matter, the MVF 104 interacts with any given DCG via a bridge component that is particularly configured to interact with the corresponding DCG. More particularly, each bridge component implements the same MVF-facing interface and provides a mapping and supporting executable logic that bridges the MVF-facing interface with the corresponding DCG's API.

Figure 2:
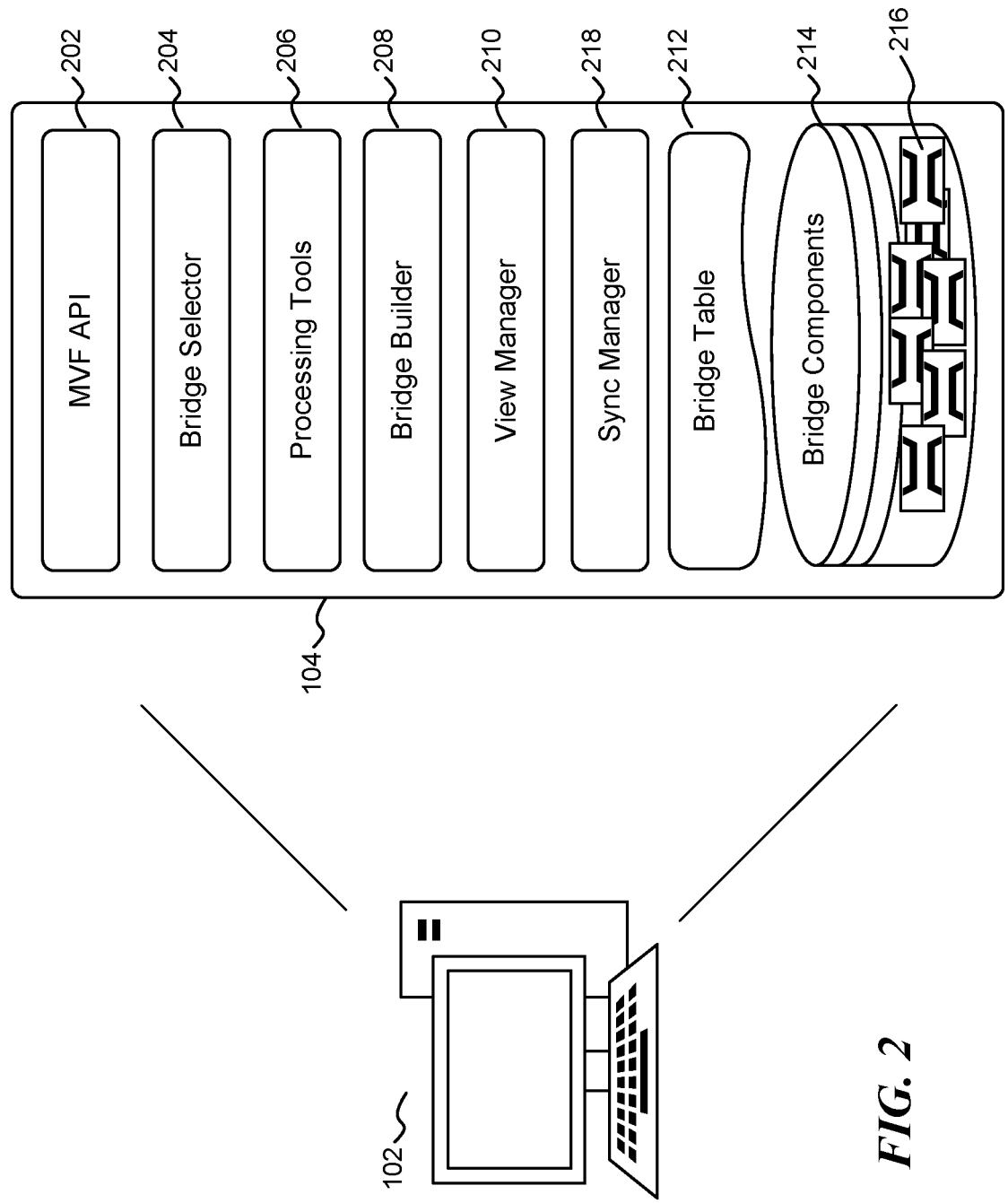
FIG. 2 is a block diagram illustrating an exemplary, logical structure of a multi-view framework, suitably configured to operate in accordance with aspects of the disclosed subject matter.

Turning then to FIG. 2, this figure is a block diagram illustrating an exemplary, logical (if not actual) executable components of a multi-view framework (MVF) 104, suitably configured to operate in accordance with aspects of the disclosed subject matter. While FIG. 2 and much of the corresponding discussion of the disclosed subject matter is made with regard to a typical personal computer, it should be appreciated that this is illustrative and should not be viewed as limiting upon the disclosed subject matter. Indeed, a suitable computer system comprises any number of devices including, but not limited to, personal computers, laptop computers, handheld computing devices, mobile communication devices, game consoles, mini- and mainframe computers, and the like.

As illustrated in this figure, the MVF 104 includes an MVF API 202. The MVF API 202 constitutes the user-facing interface for directing the display of various views from one or more DCGs with respect to a location value, interacting with the views managed by the MVF, manipulation of those views and/or the location value, adding and/or removing views managed and displayed by the MVF with respect to a current location value.

The illustrated MVF 104 also includes a bridge selector 204. The bridge selector 204 is the component of the MVF 104 that, given a request to open a view from a DCG, determines which of a plurality of bridge components available to the MVF is appropriate to interface with the API of the requested DCG. Bridge components may be stored in a bridge component data store 214. Typically, though not exclusively, the bridge selector 204 utilizes bridge table 212, a table of tuples that describe in a first element a DCG, in a second element the type of content available from the DCG, a third element identifies the particular bridge component to be used to interface with the DCG, and in optional elements the location of the DCG on a network and the location of the bridge (assuming it is not locally stored).

In many cases, though not exclusively, a bridge component is specifically developed to interact with a specific DCG. For example, and with reference to FIG. 1, bridge component 216 may be specifically configured to mapping instructions received via the MVF API 202 to the appropriate API calls associated with DCG 110. Advantageously, the use of bridge components provides a user of the MVF 104 to interact with any number of DCGs using a single UX, i.e., the MVF API 202.

According to aspects of the disclosed subject matter, for any given bridge component, there may be a 1:1 (one to one) mapping of MVF API calls to DCG API calls. However, this is likely not always the case. Accordingly, a bridge component may be configured in a hybrid: 1:1 mapping of MVF API calls to DCG API calls (where it is possible), and 1:2+(one to many) mappings (where possible), i.e., 1 MVF API call to two or more DCG API calls. Further, some hybrid mappings may include 1:1 and/or 1:2+ mappings, as well as supplemental processing by one or more tools of the processing tools 206. For example, a particular DCG may not be configured to provide an indicator at particular location within its view. In the instance that there is no direct mapping, either 1:1 or 1:2+, a given bridge component may be configured to supplement the lack of one or more operations/functions with one or more tools in the processing tools component 206. Amending the mapping may include formatting display content from the original format (as provided by the DCG) to a desired format, applying colors, shading or themes (e.g., adding colors and/or texturing to a collection of features of the view, etc.) to features within a view, adding user-interactive controls to features (or multiple features) in a view, adding dynamic location indicators to a view, and the like. The processing tools 206 may include, by way of illustration and not limitation, formatting, color and shading abilities, theming collections of features, adding user controls, and the like.

A bridge builder component 208 may be included in an MVF, such as MVF 104, to configure/create the bridges to interact with corresponding DCGs. In various embodiments of the disclosed subject matter, the bridge components are configured manually via one or more features and/or tools of the bridge builder component. However, in other embodiments, bridge components may be configured through an automated process executed by the bridge builder. Often, though not exclusively, the automated process is facilitated and completed in conjunction with a schema or metadata that defines a DCG's API, both the inputs and the outputs, with sufficient clarity that a bridge component may be suitably configured. As shown in FIG. 2, in various embodiments, bridge components may be stored in a bridge components data store 214. Alternatively, one or more online repositories hosting one or more bridge components may be accessed to obtain a suitable bridge component.

As shown in FIG. 2, the MVF also includes a view manager 210. In operation, the view manager manages the views in which the display content of DCGs is displayed. This includes presenting the content and, in some instances, acting upon user interactions with the content in the views. User interactions such as updating a location marker, entering a building (in a virtual sense), changing the perspective of the viewed location, and the like are managed and processed by the view manager. While MVF 104 is shown to include a view manager 210, and according to various embodiments of the disclosed subject matter, a view manager may not be needed as an application accessing display content from a DCG through an MVF (either one locally operating on the computer as shown in FIG. 2 or as one operating as an online service as described in FIGS. 11 and 12) may provide its own view management features.

The illustrated MVF 104 may further include a synchronization manager 218. According to aspects of the disclosed subject matter, the synchronization manager 218 may be actively involved in synchronizing what is displayed by display views of the same digital model, independent of the DCG source that generates the display content. In various embodiments, the synchronization by the synchronization manager 218 may need to be specified for any given application that wishes to synchronize.

Figure 3:
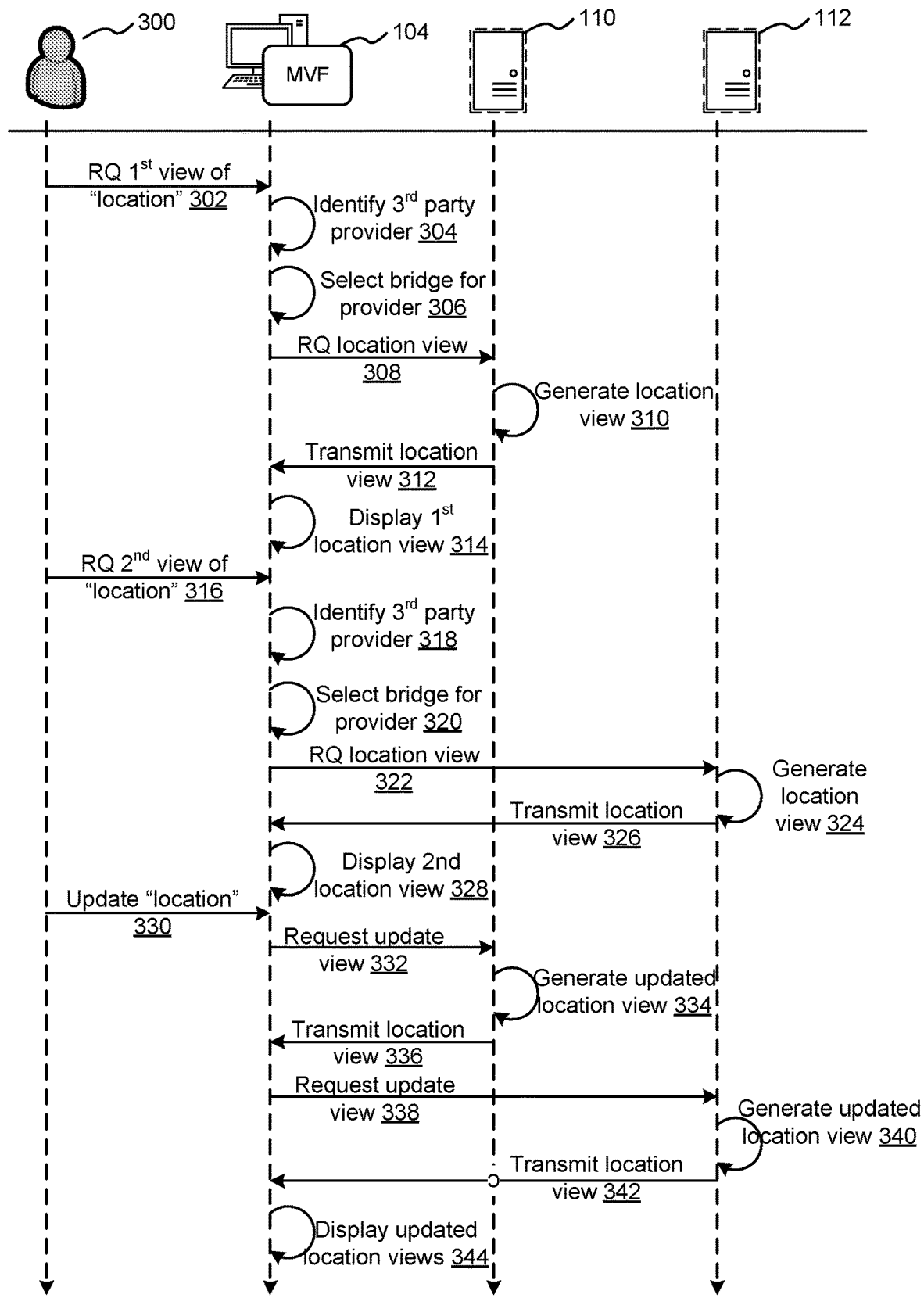
FIG. 3 illustrates a transition diagram of diagram of an exemplary sequence of interactions between a suitably configured computer system executing an MVF and third-party display content generators (DCGs), all operating in accordance with aspects of the disclosed subject matter.

To further illustrate various advantages of the MVF, reference is now made to FIG. 3. FIG. 3 illustrates a transition diagram of an exemplary and illustrative sequence of interactions between a suitably configured computer system 102 executing an MVF 104 and third-party display content generators (DCGs), all operating in accordance with aspects of the disclosed subject matter. For this exemplary sequence, it is assumed that the MVF, e.g., MVF 104, is executing on the computer system 102.

Beginning with step 302 of the exemplary sequence, user 300 initiates a request to the MVF to request a first view of data corresponding to a location. According to aspects of the disclosed subject matter, this request may include a specific DCG or simply the type of display content desired, e.g., GIS data corresponding to the location. At step 304, the MVF 104, via its bridge selector 204, selectively identifies a third-party DCG, such as DCG 110, to provide data corresponding to the request. At step 306, the bridge selector further identifies a bridge component that is suitably configured to interact with the identified DCG, e.g., bridge component 216. As indicated, in at least some embodiments of the disclosed subject matter, these selections may be based on consultation to the bridge table 212. For purposes of this exemplary sequence, selecting a bridge component also includes executing and/or initiating the bridge component for interaction with the DCG on behalf of the MVF.

With the DCG identified and a corresponding bridge component selected and executing, at step 308 and per the MVF request via the bridge component, a request to the DCG for display content corresponding to a particular location is made. The display content is sometimes referred to herein as a location view. In some embodiments, this request may include an initialization of the DCG and/or authentication of the requesting user 300 with the DCG in order to obtain the display content. For its part, at step 310 the DCG generates the display content/location value. Based on the request and the location, as well as other data that may include, by way of illustration and not limitation, a geographic location, an orientation of the data to be displayed, a perspective, coloring, shading, patterning, theming and/or interactive controls, the DCG generates the display content. It should be noted that while this sequence step 310 is shown as a single "process", and as discussed above, the overall operation of generating display content may correspond to a 1:2+ relationship in API calls by the bridge component on the DCG to generate the display content as request by the user's request (from sequence step 302).

At sequence step 312, the display content is returned to the MVF via the selected bridge component. Additionally, as discussed above, the bridge component may further update, modify and/or add to the location view from the DCG in order to put the location view in a format and displayable state that conforms to the request 302 from the user. At sequence step 314 and via view manager 210, a first content view 404 of the requested location is displayed to the user in a display window 400 managed by the MVF on a computer display of the computer system 102.

With additional reference to FIGS. 4A-4F, FIG. 4A is a pictorial diagram illustrating a display window 400 of an MVF having a displayable window 402 for displaying a content view(s), such as first content view 404, from a third-party DCG, in accordance with aspects of the disclosed subject matter. More particularly, the display window 400 includes a first content view 404 showing display content data provided by a first DCG in response to the first request sent by the user to the MVF in sequence step 302. As shown in content view 404, the displayed content includes patterning (specific buildings in the image are displayed with a dotted pattern), theming (the buildings in theming area 405 are shown with solid lines), and actionable controls (bubble icons on top of the darker colored building indicating the ability to interact at that point more directly) such as actionable control 414.

Figure 4A:
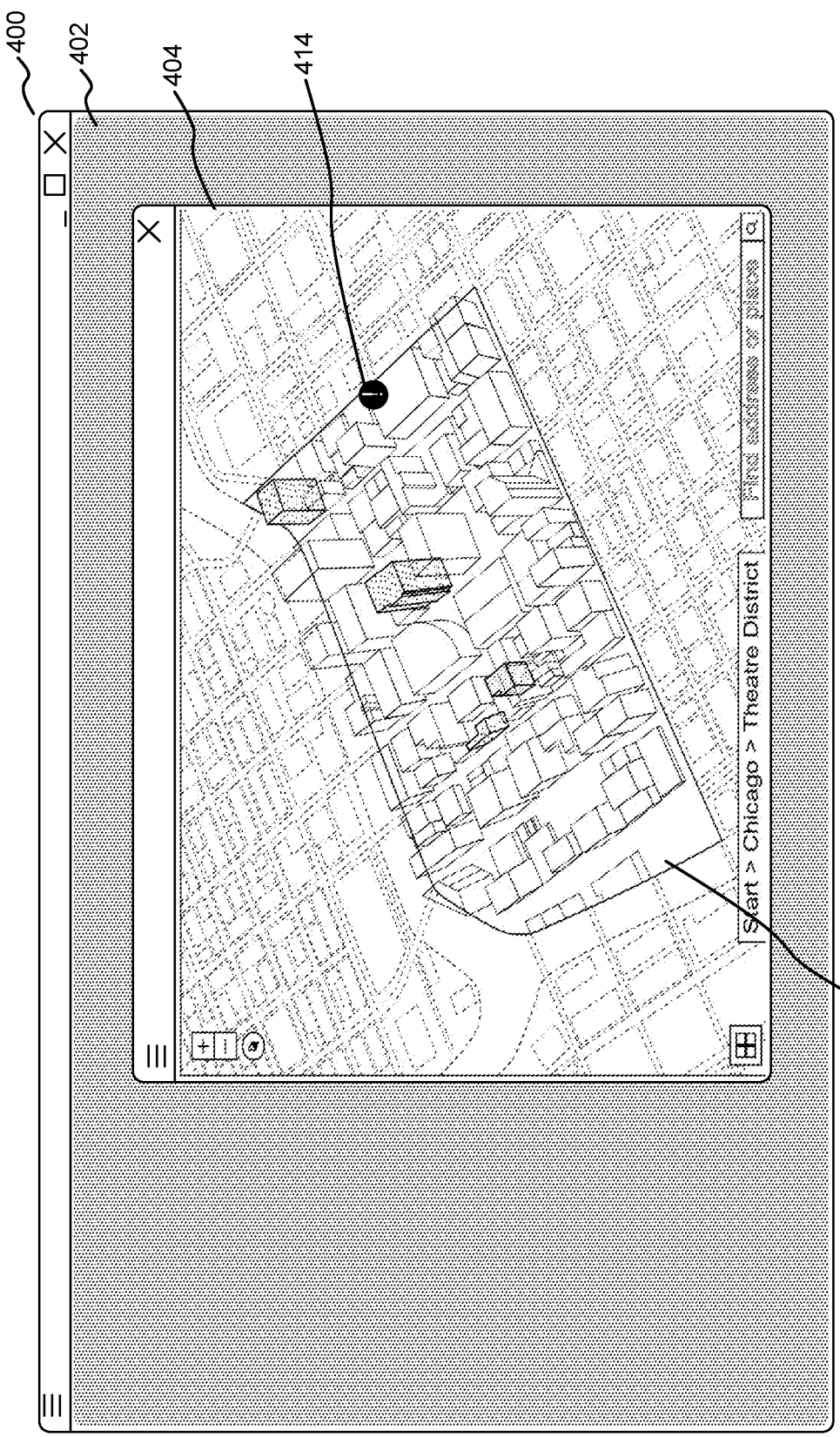
FIGS. 4A-4F are pictorial diagrams illustrating a display window of an MVF in displaying content views from third-party display content generators in accordance with aspects of the disclosed subject matter.

While not shown in FIG. 4A, in addition to patterning, colors and/or shading may be used in identifying certain buildings and/or other features. Similarly, theming may include coloring, patterning and/or shading to identify a collection of subjects or features to be distinguished. Theming and shading/coloring may be specified in the request sent to the DCG, generated by the DCG according to API calls, and/or self-generated by the DCG as part of its typical service. Further, theming and coloring may be implemented by processing tools in the situation that a DCG does not provide such services. Similarly, controls may be added by the DCG (per one or more API calls) and/or added by the bridge component prior to presenting the display content in the display view, such as display view 404.

Figure 4B:
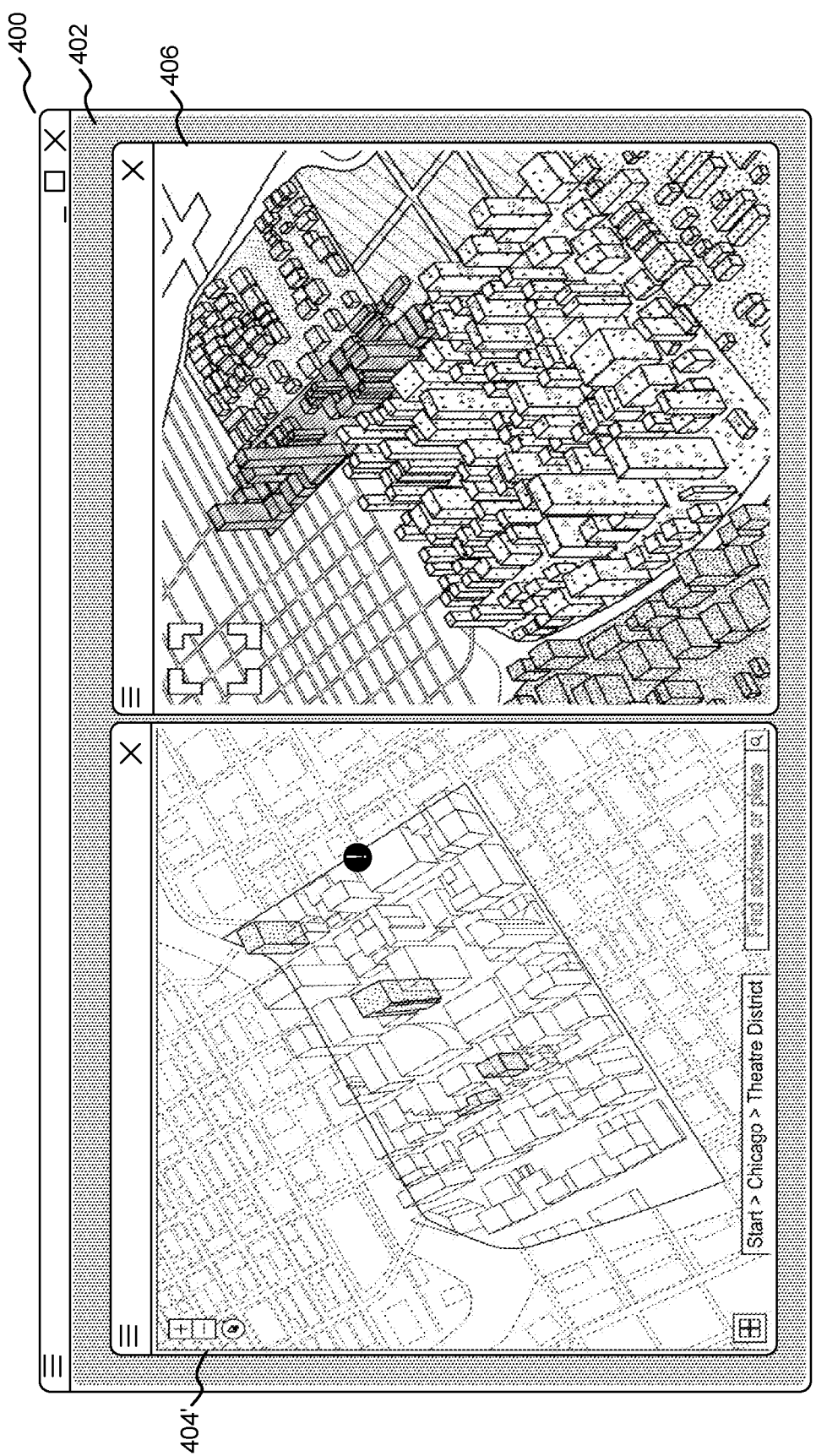

With respect to FIG. 3, after displaying the first display content from a first DCG in a first display view 404, the exemplary sequence includes a step 316 that sends a second request to the MVF for a second view of the same location of the first request. At sequence step 318, a bridge selector 204 identifies a second DCG according to the request for providing the requested display content. As sequence step 320, a second bridge component is selected from a plurality of bridge components for bridging communications between the MVF and the identified second DCG. At sequence step 322, the MVF (via the second bridge component) sends the request to the second DCG for display content corresponding to the location. According to the same general principles above, at sequence step 324 the second DCG generates the requested display content. At sequence step 326, the second display content (from the second DCG) is returned, via the second bridge component, to the MVF. While not shown in a sequence step, additional processing by the second bridge component may be carried out to place the second display content into a form that matches that of the second request. At sequence step 328, the second display content is displayed in a second display view 406 in the display window 402, as shown in FIG. 4B. Additionally, according to aspects of the disclosed subject matter, view management including the addition of a second content view 406 in the display window 402 and the resizing of first content view 404 (now shown as first content view 404', as shown in FIG. 4B) and the arranging of the views within the display window, is carried out by the view manager component 210, as discussed in FIG. 2.

According to aspects of the disclosed subject matter, the location of a request to one or more DCGs may or may not correspond to a static location. Indeed, in many instances the "location" to be displayed by disparate display views corresponds to a dynamic location. By way of illustration and not limitation, a location may correspond to a person that is moving within a general area. Or, as another non-limiting example, a location of an avatar moving within a particular geographic area in an online game may be the source of the dynamic location. Advantageously and according to aspects of the disclosed subject matter, the movement of a dynamic location may be reflected and/or synchronized between multiple display views managed by the view manager 210 of the MVF 104.

Figure 4C:
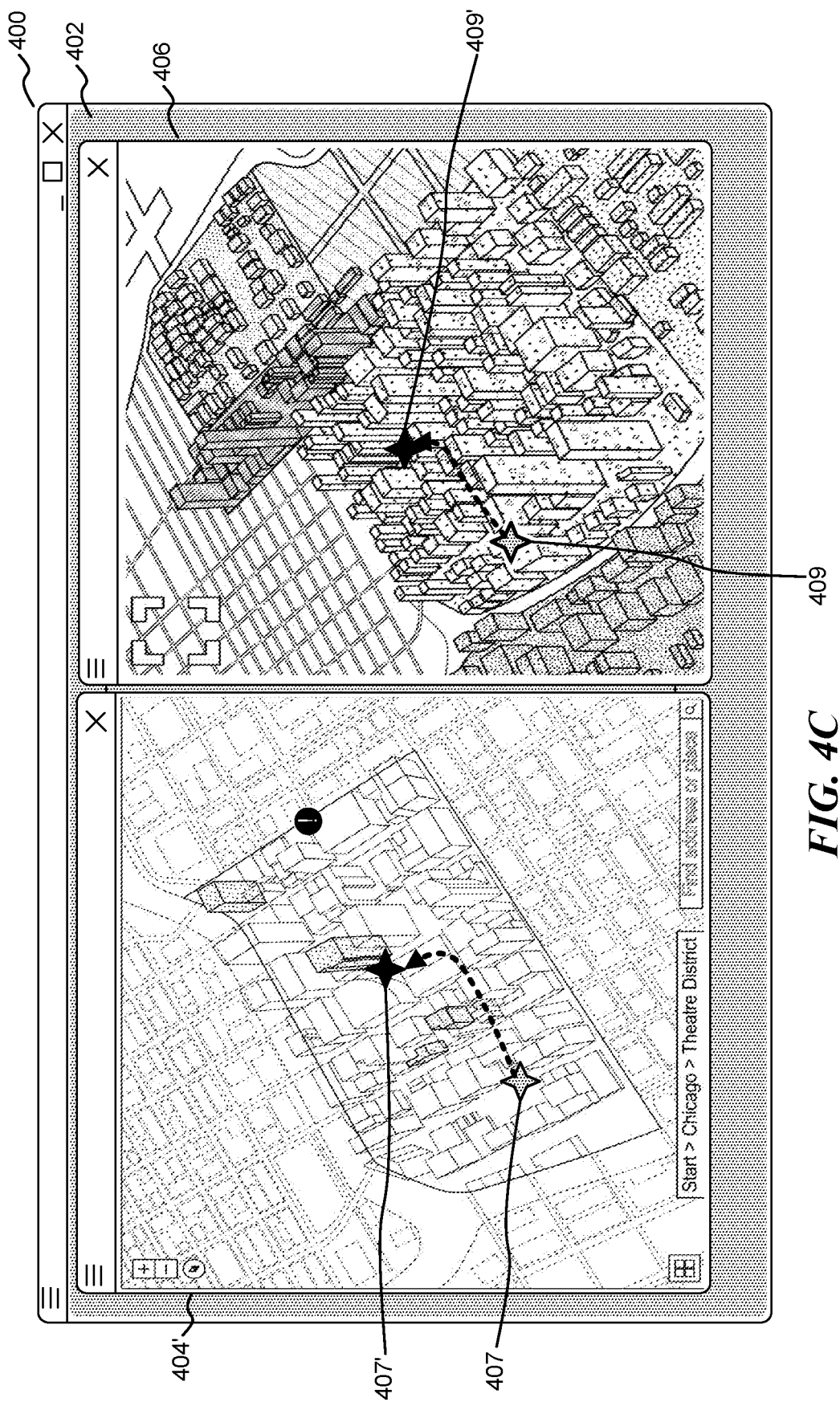
Figure 4D:
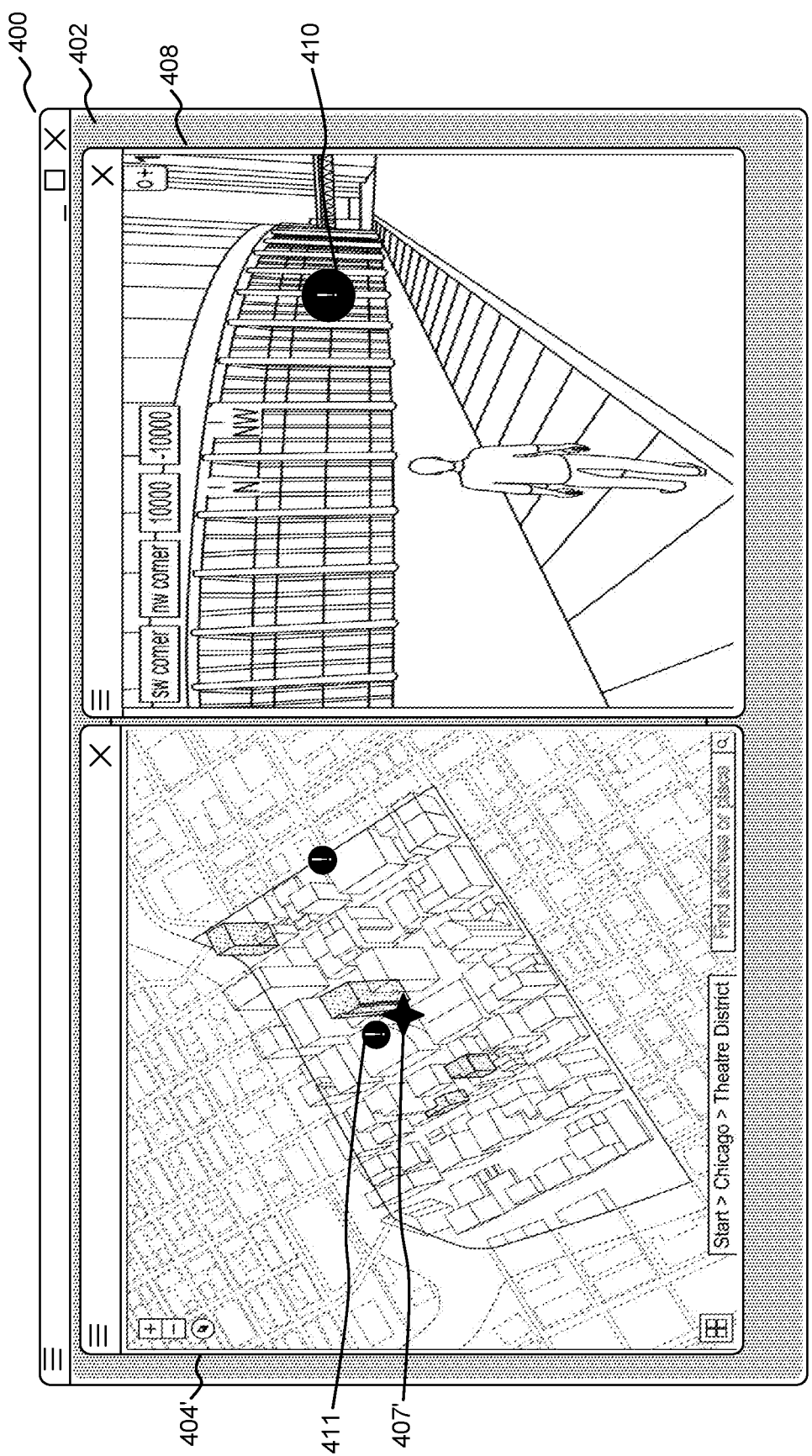

With reference to FIGS. 3 and 4C, assumed that the first and second requests included information regarding a moving "thing" (person, avatar, vehicle, drone, etc.) within the general area displayed by both the first and second display views 404' and 406. In particular, assume that the first and second requests of sequence 300 both included a request that a marker be placed to indicate a dynamic location. As shown in FIG. 4C, the initial locations are identified in display views 404' and 406 as markers 407 and 409 respectively, and according to embodiments of the disclosed subject matter, illustrate synchronization of view models and data between disparate by an MVF 104.

At sequence step 330, an update location message is received by the MVF. As indicated above, the source of the updated location may be due to the movement of a tracked "item," may be at the direction of a user to update the location of a marker, an any of a number of actions that may cause an updated location to be reflected in the display views. At sequence step 332, a message regarding the updated location is transmitted, via the first bridge component, to the first DCG. At sequence step 334, the first DCG generates updated first display content based on the updated location. At sequence step 336, the updated first display content is transmitted to the MVF via the first bridge component. Similarly, at sequence step 338, a message regarding the updated location is transmitted, via the second bridge component, to the second DCG. At sequence step 340, the second DCG generates updated second display content based on the updated location. At sequence step 342, the updated second display content is transmitted to the MVF via the second bridge component. At sequence step 344, both the first updated display content and the second updated display content are displayed in their respective display views 404' and 406. According to the present example, only the respective markers moved, as indicated by markers 407' and 409'. An illustrative path may also be displayed. In short, through the use of bridges, the MVF may coordinate and/or synchronize display content in display views among disparate DCGs, including DCGs that are not related, by source or programming, to each other or to the MVF. Advantageously, this creates an environment in which completely disparate display content generators may be "integrated" within a single application or tool, using a single user experience.

As mentioned earlier, display views may include user-actionable controls to carry out various functions. By way of example and illustration with respect to FIG. 4D, assume that a user has interacted with control 411 in display view 404' causing a third display view 408 to present display content from a third DCG (via a third bridge component specifically configured to interface with the third DCG.) In this instance, the interaction with control 411 causes another display, in this case the third display view 408, to be presented, which is a close-up view of the area at the current location, as indicated by marker 407', in the first display view 404'. Advantageously, the MVF allows for robust exploration of display content using disparate, third-party DCGs, and synchronizes between these using a single application with a single user experience, irrespective of each DCG having its own particular API.

Figure 4E:
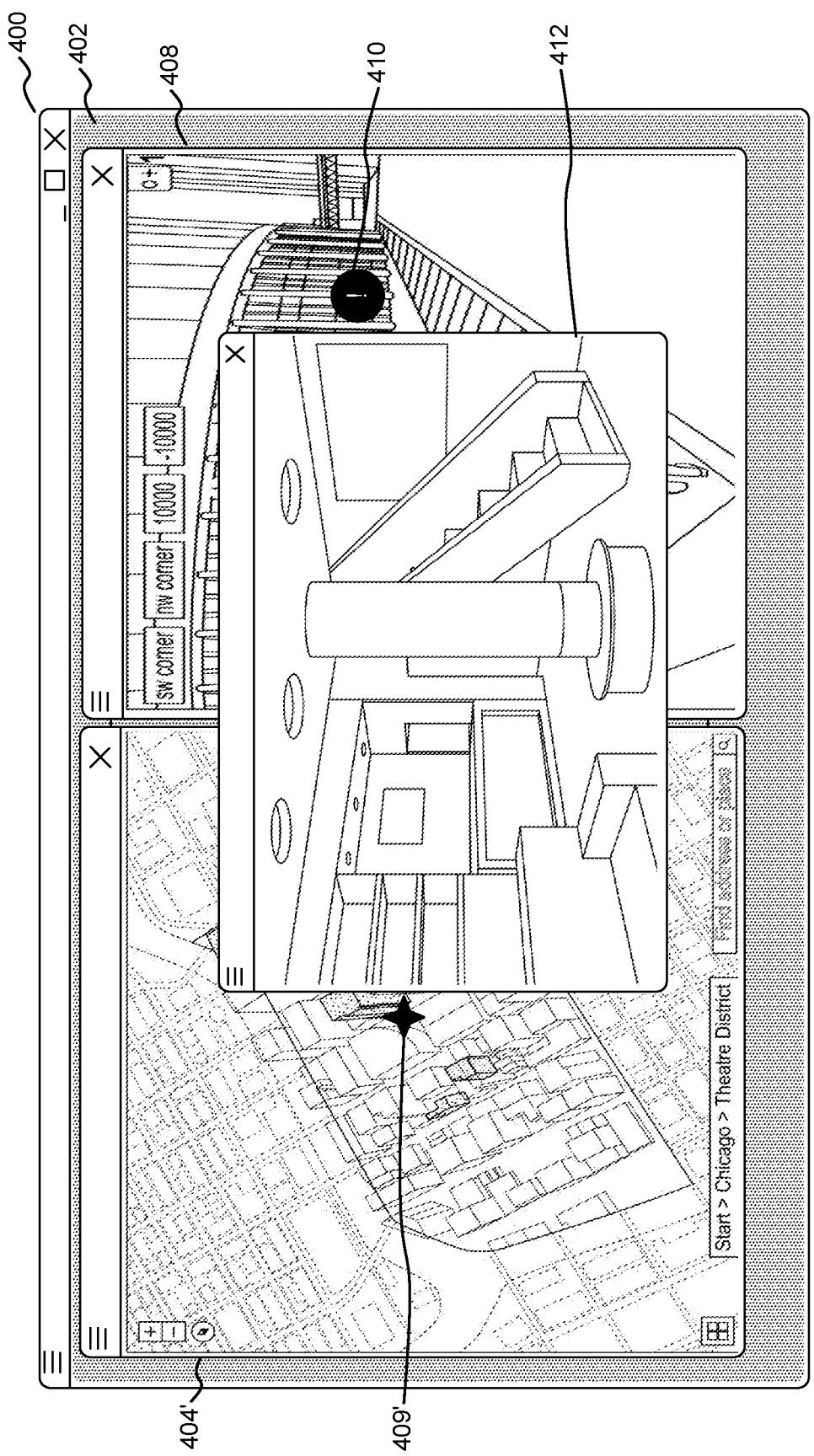
Figure 4F:
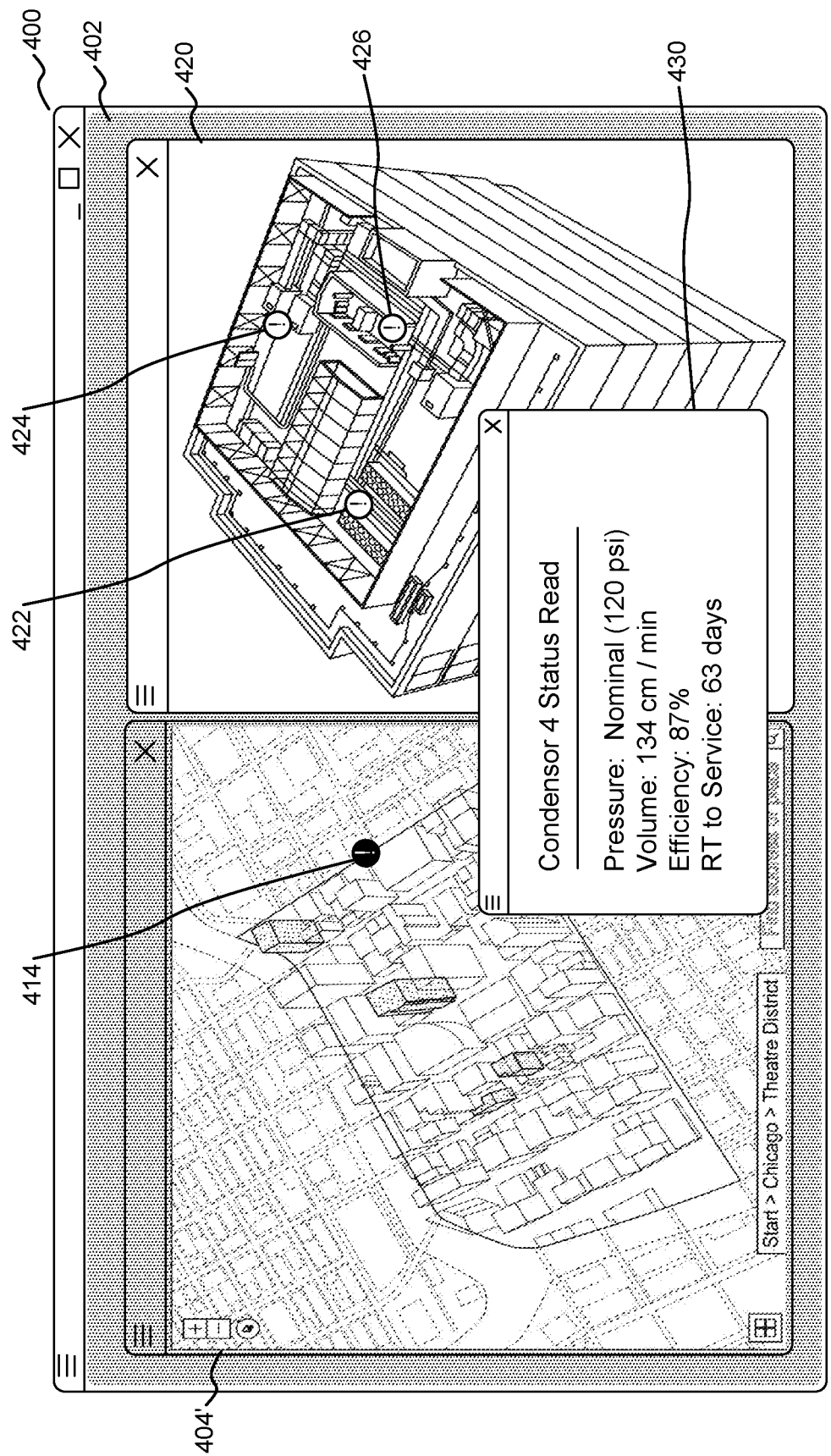

In furtherance of the example above, assume that the user of the MVF activates the user-actionable control 410 in display view 408, which is designed to provide an even greater, in-depth exploration of content. With reference to FIG. 4E, in response to the user activation of control 410, a fourth display view 412 is displayed, showing the interior of the building displayed in the third display view 408. According to aspects of the disclosed subject matter, and by way of example and illustration, the display content of the fourth display view 412 may correspond to a 360-degree, interactive view which a user can pan around to view the interior of a building.

According to aspects of the disclosed subject matter, display views may comprise image data, video data, audio data, textual data, gauges, etc. Control of what is displayed is encoded into the various controls and may be determined according to a display request from the user, where the display request is mapped to a DCG and obtained from the mapped DCG via a corresponding bridge component. Indeed, turning to FIG. 4F, this illustrates an example of a user interacting with control 414 of the first display view 404'. In this example, a skeletal display view 420 of the building under control 414 is displayed. As can be seen, skeletal display view 420 includes multiple actionable controls 422, 424 and 426. Assuming, as a continuation of the above example, that the user selects control 422 regarding the A/C compressors, an informational display view 430 is presented on the display window 400 showing the current status of the A/C compressor.

Figure 5:
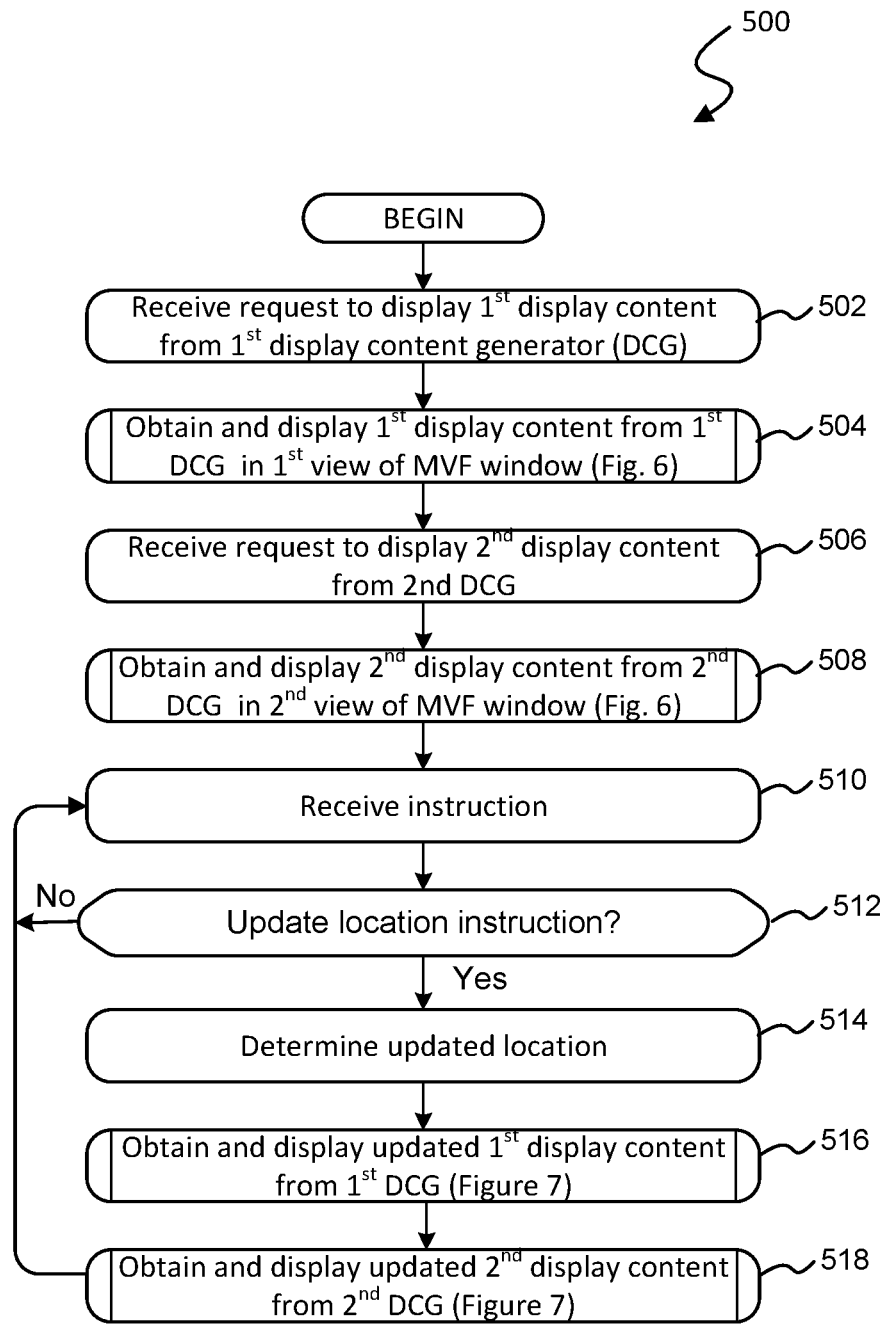
FIG. 5 is a flow diagram illustrating an exemplary routine of an MVF for presenting and coordinating views of third-party display content generators with respect to a location, in accordance with one or more elements of the disclosed subject matter.

Turning, now, to FIG. 5, this figure is a flow diagram illustrating an exemplary routine 500 of an MVF for presenting and coordinating views of third-party display content generators with respect to a location. Beginning at block 502, and according to aspects of the disclosed subject matter, a first request is received with regard to presenting/displaying content from a first display content generator (DCG), where the first DCG is a third-party service to the MVF.

Regarding the first request to the MVF, or the requests on the MVF generally, and according to various embodiments of the disclosed subject matter, a request may identify and/or include, by way of illustration and not limitation, an item or thing to be presented (such as a particular location), theming and/or coloration to be added to aspects of the presentation of the item or features of or associated with the item, a DCG to generate the display content of the item, an orientation of the generated display content (i.e., the position—above, from the south, from the west, etc., as well as distance from the item—from which the presentation should be generated), user controls that should be included within the generated display content, and the like. Information such as access credentials to the DCG may also be included in a request, especially in a first request/session to that DCG.

At block 504, the MVF obtains and displays the first display content in a display view in the MVF's display window on the computer display. FIG. 4A provides an illustration of a display view 404 displaying content in the MVF's display window 400. Obtaining and displaying display content in a display view is described in greater detail with respect to subroutine 600 of FIG. 6.

Figure 6:
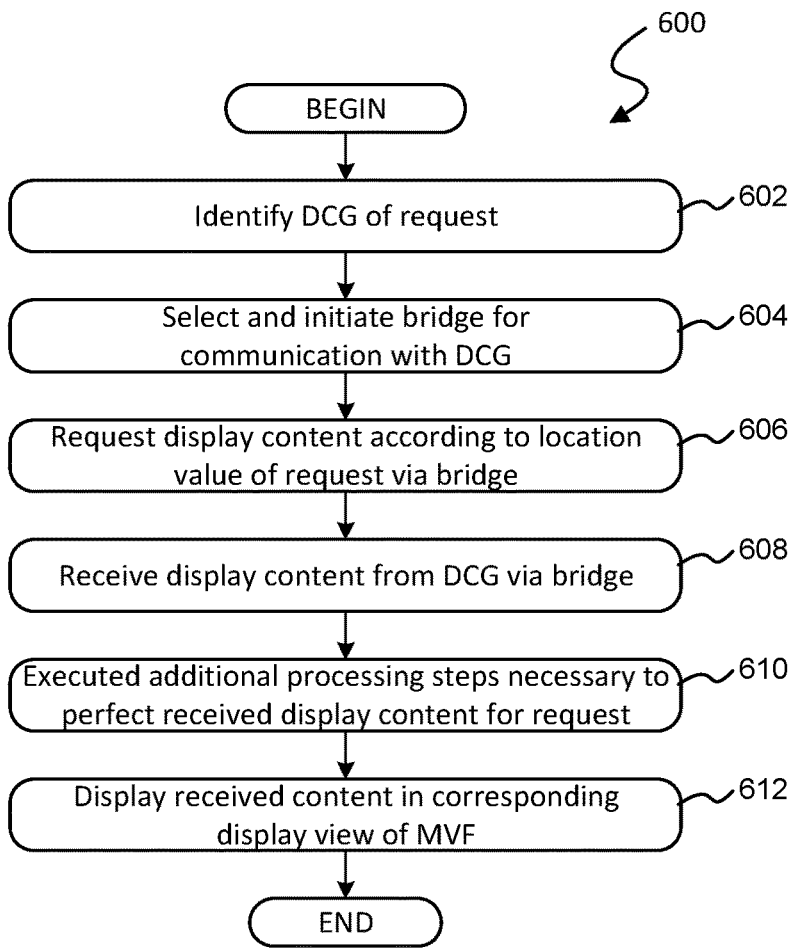
FIG. 6 is a flow diagram illustrating an exemplary subroutine for identifying a DCG to satisfy a request, selecting and initiating a bridge component for the DCG, and obtaining display content from a DCG via the bridge component in response to a request, in accordance with aspects of the disclosed subject matter.

Indeed, turning to FIG. 6, this figure is a flow diagram illustrating an exemplary subroutine 600 for identifying a DCG to satisfy a request received by the MVF, and further selecting and initiating a bridge component for and specifically corresponding to the DCG, obtaining display content from a DCG via the bridge component, and presenting the display content in a display view in response to the request, all in accordance with aspects of the disclosed subject matter. Thus, at block 602, the DCG is identified. According to aspects of the disclosed subject matter, this identification may be made according to a query of a bridge table 212 maintained by the MVF with respect to available, third-party DCGs. Alternatively, the identification may be made according to a query of a database that maintains records of third-party DCGs. In any event, as part of the identification, access information (e.g., local execution of the DCG, remote access addresses, and the like) is also obtained from the lookup query. Further still, information regarding user credentials may be stored in a bridge table and/or database storing the information of the third-party DCGs.

At block 604, a bridge component configured to be an interface between the MVF and the identified DCG is identifies and selected from a plurality of available bridge components. The basis of this identification may be according to information in the bridge table 212 or database, or a separate data source/table may be utilized. In addition to selecting a specifically configured bridge component, that bridge component is initialized (or executed) to carry out the interface functionality between the MVF and the identified DCG.

At block 606, the operating/executing bridge component, on behalf of the MVF, issues a request for display content from the identified DCG by way of one or more API calls on the DCG. Through these API calls, the operating/executing bridge component provides the information necessary to obtain the requested display content from the DCG. In regard to the illustration of FIG. 4A, the information may include a location, theming and patterning to applied to various features of the display content.

At block 608, display content is obtained (via the bridge component) from the DCG. At block 610, as some of the requested aspects of the display content may not be present in the received display content and according to aspects of the disclosed subject matter, the bridge component may make calls on functionality in the presentation tools to augment the display content from the DCG, such as (by way of illustration and not limitation) content formatting and/or sizing, the addition of user controls, theming, coloring, specific location markers, and the like.

At block 612, the operating/executing bridge component utilizes view manager 210 to display the received (and potentially augmented) display content in a display view. Thereafter, the subroutine 600 terminates.

Referring again to routine 500 of FIG. 5, at block 506, a second request is received with regard to presenting/displaying content corresponding to the same item as in the first request, but from a second display content generator (DCG), where the second DCG is a third-party service to the MVF and to the first DCG. At block 508, the MVF obtains and displays second display content in a display view in the MVF's display window on the computer display. The process to carry out obtaining and displaying second display content are set forth in subroutine 600, as already discussed above, resulting in a second display view displaying second display content, where the first display content and the second display content are alternative views of the same item. An example of two display views of the same item is set forth in FIG. 4B.

While the first portion of routine 500, through block 508, illustrate the operation of presenting display content from disparate, unrelated DCGs from an application having a single user experience, blocks 510-518 illustrate the operation of maintaining synchronization between DCGs such that the display content of a first DCG is generally synchronized with the display content of a second DCG. To that end, at block 510, the illustrative routine waits upon receiving an instruction from the user—of which most are not treated with this illustrative routine while all would be dutifully processed in an actual implementation of an MVF. However, for purposes of this routine 500, at block 512, a determination is made as to whether the received particular instruction was an update to a location value, as illustrated in regard to FIG. 4C and the corresponding discussion.

At block 512, a determination is made as to whether the instruction is an "update location" instruction. If not, the illustrative routine 500 returns to block 510 to await additional instructions. However, if this instruction is one to update the location, the routine 500 proceeds to block 514. At block 514 and based on the received instruction, an updated location is determined. At block 516, the MVF obtains and displays updated display content, corresponding to the updated location, from the first DCG. Details regarding the process of obtaining updated display content as set forth in regard to routine 700 of FIG. 7.

Figure 7:
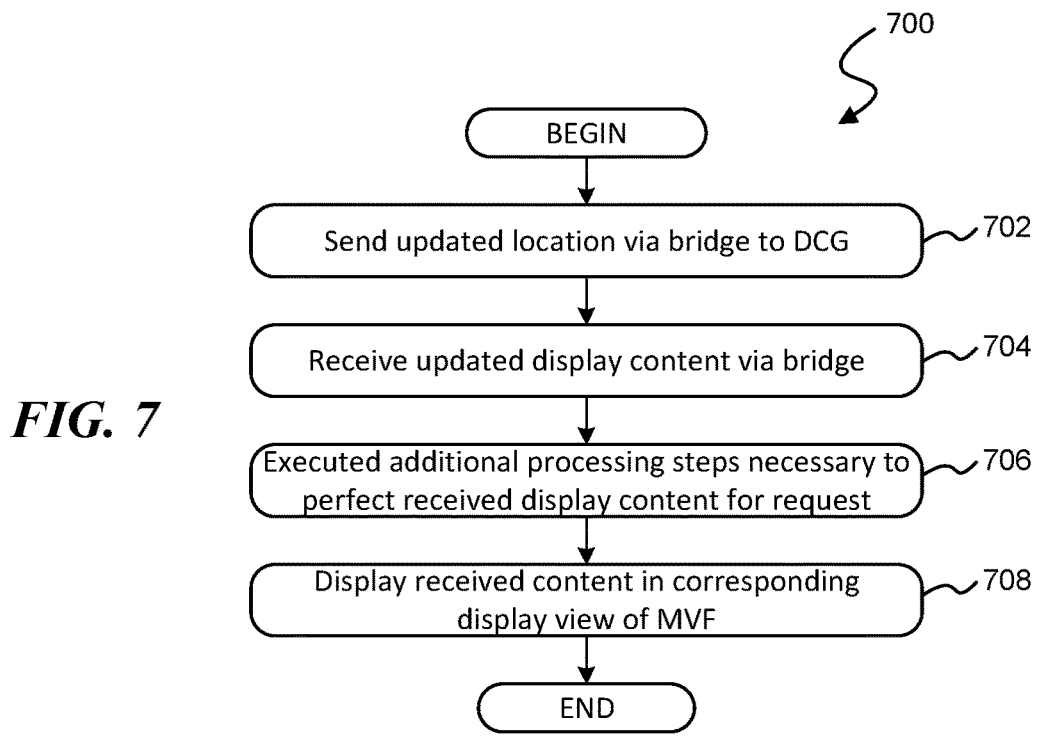
FIG. 7 is a flow diagram illustrating an exemplary subroutine for obtaining updated display content from a DCG, via a corresponding bridge, for display in a display view, in accordance with aspects of the disclosed subject matter.

Turning to FIG. 7, this figure is a flow diagram illustrating an exemplary subroutine 700 suitably configured for obtaining updated display content from a DCG, via a corresponding bridge in response to an updated location, all in accordance with aspects of the disclosed subject matter. Beginning at block 702, the updated location is sent to the corresponding DCG, via the bridge component, for updated content information. At block 704, updated display content is received from the corresponding DCG. It should be noted that in some embodiments, most or all of the display content already on display in the display view for the DCG will remain the same. Or perhaps only a specific location indicator, as shown in FIG. 4C, needs be updated. Thus, at various times and in various embodiments, less than an entire display view of display content is returned. Of course, the corresponding bridge component is responsible for calling the appropriate APIs of the DCG to obtain the desired display content from the DCG.

After receiving the updated display content, at block 706, any processing steps necessary to put the received updated display content into a form that is desired according to the current instruction is carried out by the bridge component. Thereafter, at block 708, the updated display content (which may have been processed by one or more processing tools on the MVF) is displayed in its corresponding display view. Thereafter, the subroutine 700 terminates.

Returning to routine 500 of FIG. 5, after updating the first display view with updated display content from the first DCG, at block 518 the process repeats the obtaining and displaying step for updated second display content from the second DCG. Thereafter, the routine 500 returns to block 510 to await further instructions.

While synchronizing the display of content from disparate DCGs with respect to an updated location has been discussed and illustrated, it should be appreciated that the synchronization aspect may touch on any number of features of a given display view. For example, adding and/or removing elements from the underlying item being presented can cause each of a plurality of display views to update its content. Changing the view orientation of content in a first display view may cause a synchronization of view orientation to occur in other display views.

Figure 8:
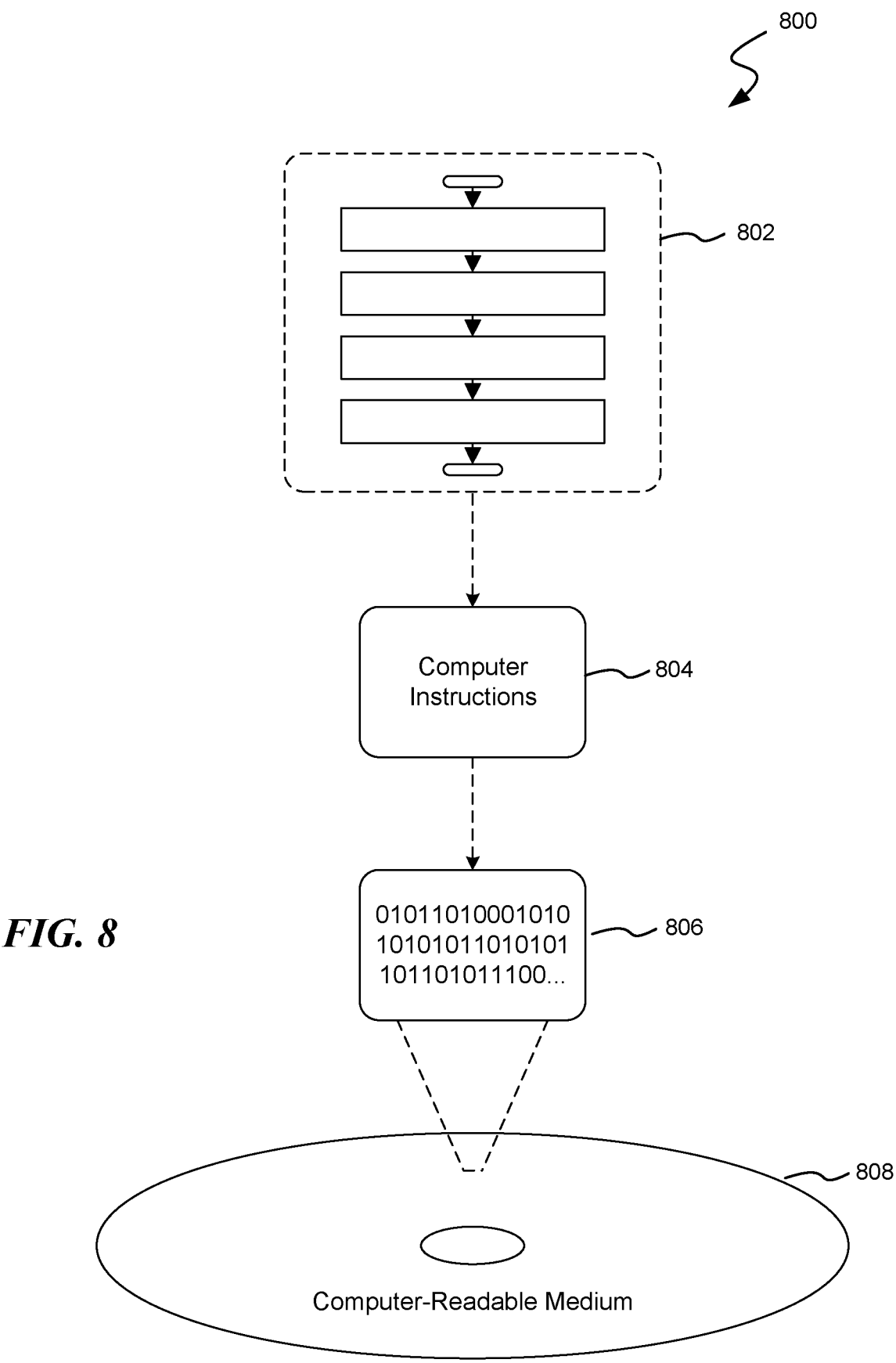
FIG. 8 is a block diagram illustrating a logical organization of computer-readable media bearing executable components that, when executed on a computer system, implement an MVF in accordance with aspects of the disclosed subject matter.

Turning now to FIG. 8 is a block diagram illustrating a logical organization 800 of computer-readable media bearing executable components that, when executed on a computer system, implement an MVF in accordance with aspects of the disclosed subject matter. As will be appreciated by those skilled in the art, the logical organization comprises computer-readable medium 808 (e.g., a CD-R, DVD-R or a platter of a hard disk drive), on which is encoded computer-readable data 806. Non-limiting examples of a computer-readable medium (or media) include optical media (e.g., compact discs, "CDs", in various writable and/or non-writable forms, digital versatile discs, "DVDs" in their various writeable and/or non-writable forms, etc.), solid-state memory devices (e.g., USB "thumb" drives, flash memory cards or devices, etc.), magnetic discs and tapes, read-only cartridge devices, hard drives, and the like.

This computer-readable data 806 in turn comprises a set of computer-executable instructions 804 that, when executed by a processor of a computer, operate according to one or more of the embodiments of a multi-view framework (MVF) set forth herein. In one such embodiment, the computer-executable instructions 904 may be configured to perform one or more methods and/or routines, such as exemplary method 600, for example and without limitation. In another such embodiment, the computer-executable instructions 804 may be configured to implement logical elements of a computing system, such as at least some of the exemplary computing system 900, as described below. The logical steps and/or computer-executable instructions are indicated by the logical elements 802.

Figure 9:
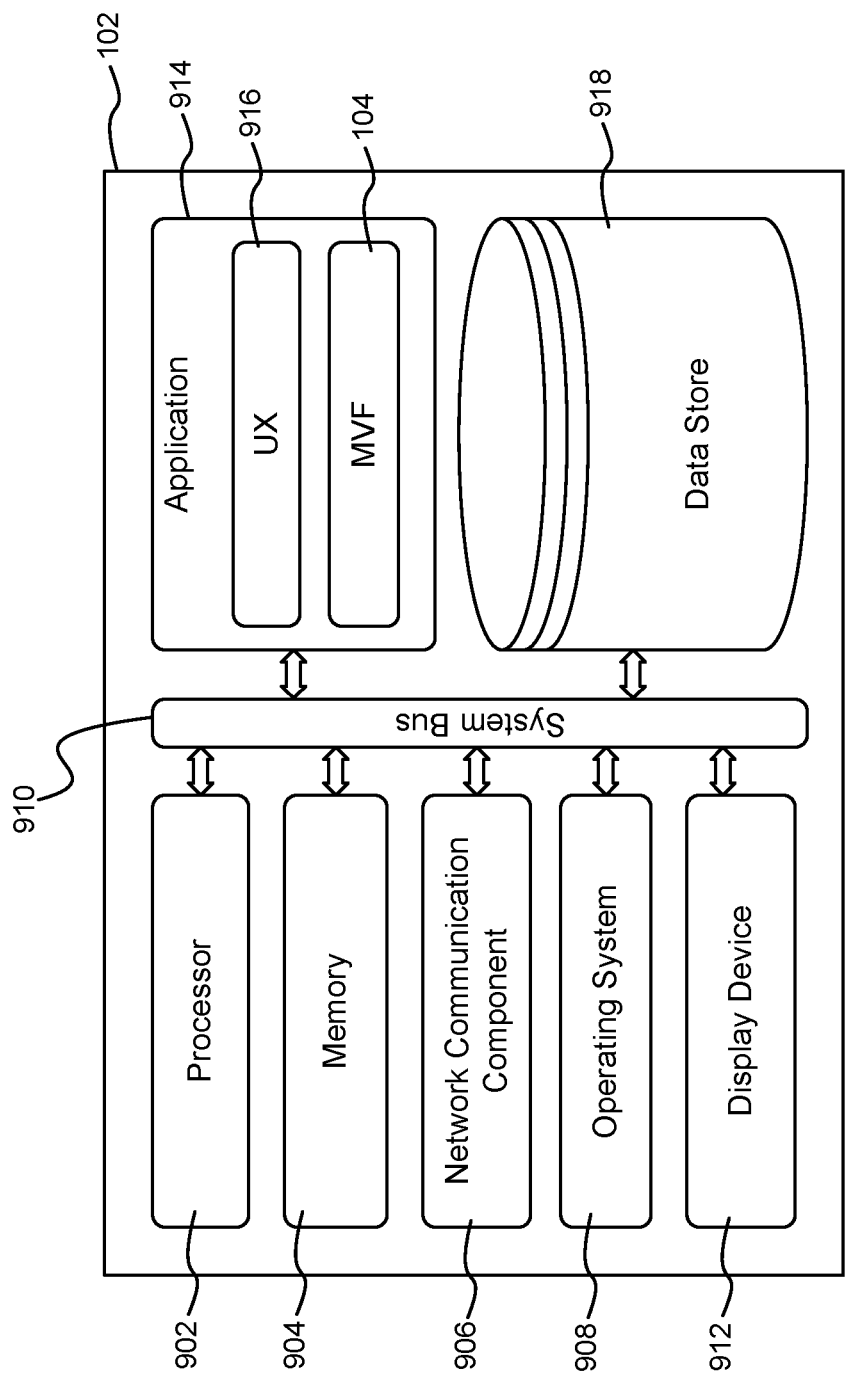
FIG. 9 is a block diagram illustrating an exemplary computer system suitably configured to operate as an MVF in accordance with aspects of the disclosed subject matter.

Turning to FIG. 9, this figure is a block diagram illustrating an exemplary computer system suitably configured to operate as an MVF in accordance with aspects of the disclosed subject matter.

The exemplary computing system 102 includes one or more processors (or processing units), such as processor 902, and also includes a memory 904. The processor 902 and memory 904, as well as other components of the computing system 102, are interconnected by way of a system bus 910.

As those skilled in the art will appreciate, the memory 904 typically, but not exclusively, comprises both volatile and non-volatile memory. As will be readily appreciated, volatile memory retains or stores data and/or information so long as the volatile memory is supplied with power. In contrast, non-volatile memory stores, or persists, data and/or information even when a power is not supplied to that memory. Generally speaking, in a computer system, memory components such as random-access memory (RAM) and CPU cache memory are examples of volatile memory. In contrast, read-only memory (ROM), solid-state memory devices, memory storage devices, and/or memory cards are examples of non-volatile memory.

As will be appreciated by those skilled in the art, the processor 902 executes computer-executable instructions retrieved from the memory 904, and/or from computer-readable media, such as the computer-readable media 800 of FIG. 8, in carrying out implementing and executing defined functions and instructions. According to various embodiments of the disclosed subject matter, an MVF may be implemented through the execution of instructions by the processor 902. The processor 902 may be comprised of any of number of available processors including, by way of illustration and not limitation, single-processor, multi-processor, single-core units, and multi-core units, and the like.

The illustrated computing system 102 also includes a network communication component 906 for interconnecting this computing system with other devices and/or services over a computer network. The network communication component 906, sometimes referred to as a network interface card or NIC, communicates over a computer network using one or more communication protocols via a physical/tangible (e.g., wired, optical, etc.) connection, a wireless connection (e.g., Bluetooth, Wi-Fi, etc.), or a combination if both. As will be readily appreciated by those skilled in the art, a network communication component, such as network communication component 906, is typically comprised of hardware and/or firmware components, and may also include or comprise executable software components, that transmit and receive digital and/or analog signals over a transmission medium (i.e., the computer network.) The bridge components described above utilize the network communication component 906 to communicate with remotely located DCGs.

The exemplary user computing system 102 also typically includes an operating system 908 that provides various basic and/or foundational functions and services for the computer system, applications and apps that execute on the computer system. These functions and services include, by way of illustration and not limitation, an input/output (I/O) subsystem comprising a set of hardware, software, and/or firmware components that enable or facilitate inter-communication between a user and the computing system 102. Indeed, via the I/O subsystem a user may provide input via one or more input channels such as, by way of illustration and not limitation, touch screen/haptic input devices, buttons, pointing devices, audio input, optical input, accelerometers, and the like. Output or presentation of information may be made by way of one or more of display devices 912 (an example is shown as display device 114 of FIG. 1), audio speakers, haptic feedback mechanisms, and the like. As will be readily appreciated, the interaction between a user and computer system 102 is enabled via the I/O subsystem. Additionally, system services provide additional functionality including location services (e.g., GPS services), timers, interfaces with other system components such as the network communication component 910, and the like.

The exemplary computer system 102 also includes various executable components, typically but not exclusively implemented as software components, which configure the computer system to carry out various features and/or tasks including, but not limited to, an application 914 with a user experience module 916 that implements and instructs a multi-view framework 104, as described above.

Regarding the various components of the exemplary computer system 102, those skilled in the art will appreciate that many of these components may be implemented as executable software modules stored in the memory of the computer system, as hardware modules and/or components (including SoCs—Systems On a Chip), or a combination of the two. Indeed, components may be implemented according to various executable embodiments including executable software modules that carry out one or more logical elements of the processes described in this document, or as a hardware and/or firmware components that include executable logic to carry out the one or more logical elements of the processes described in this document, especially including the MVF. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

As mentioned above, one of the advantages of the disclosed subject matter is that utilizing an application configured as an MVF, a user need only to learn and interact with a single user experience yet be fully able to utilize disparate digital models from disparate sources/DCGs. In short, the user does not need to understand how to interact with the "other," third-party DCGs, nor what particular controls or functions must be carried out to achieve desired goals. The user need only understand the UX of the MVF enabled application, allowing the bridge components to carry out the interfacing of a user's instructions between the MVF and one or more DCGs.

According to aspects of the disclosed subject matter, logic encoded into the bridge components carry out the mapping of user instructions to the MVF to API calls. This mapping may be encoded into individual bridge components and/or encoded into data sets that, when interpreted by the bridge components, enable the bridge components to carry out the mapping between UX instructions and DCG APIs.

By way of example and illustration, reference is again made to FIGS. 4A and 4B. Assume that through the UX of the application, the user instructs the MVF to open a display view, e.g., display view 404, of display content of a to-be-displayed geographic area. Moreover, and as displayed in FIG. 4A, the to-be-displayed geographic area should be displayed as a three-dimensional view with wireframe lines displaying the features of the geographic area. Further still, instead of viewing the to-be-displayed geographic area from directly overhead, the view should have an orientation (the direction in which the to-be-displayed geographic area is perceived, e.g., a view the area from a position south-west of the area looking to the north-east), an angle and/or elevation of the to-be-displayed geographic area, as well as a distance of the viewing position from the to-be-displayed geographic area. Any of all of these features of the to-be-displayed geographic view, as well as others, can be provided to the MVF 104 of the computer system 102 to generate the display content of the display view 404. However, the instructions provided to the MVF through the UX very likely do not correspond to the exact same instructions of a first DCG that is utilized to provide the to-be-displayed geographic area in the first display view 404. Thus, the bridge component corresponding to that first DCG is particularly configured to "map" the instructions and input to appropriate API calls of the first DCG, as well as appropriately interpret the returned data.

Figure 10:
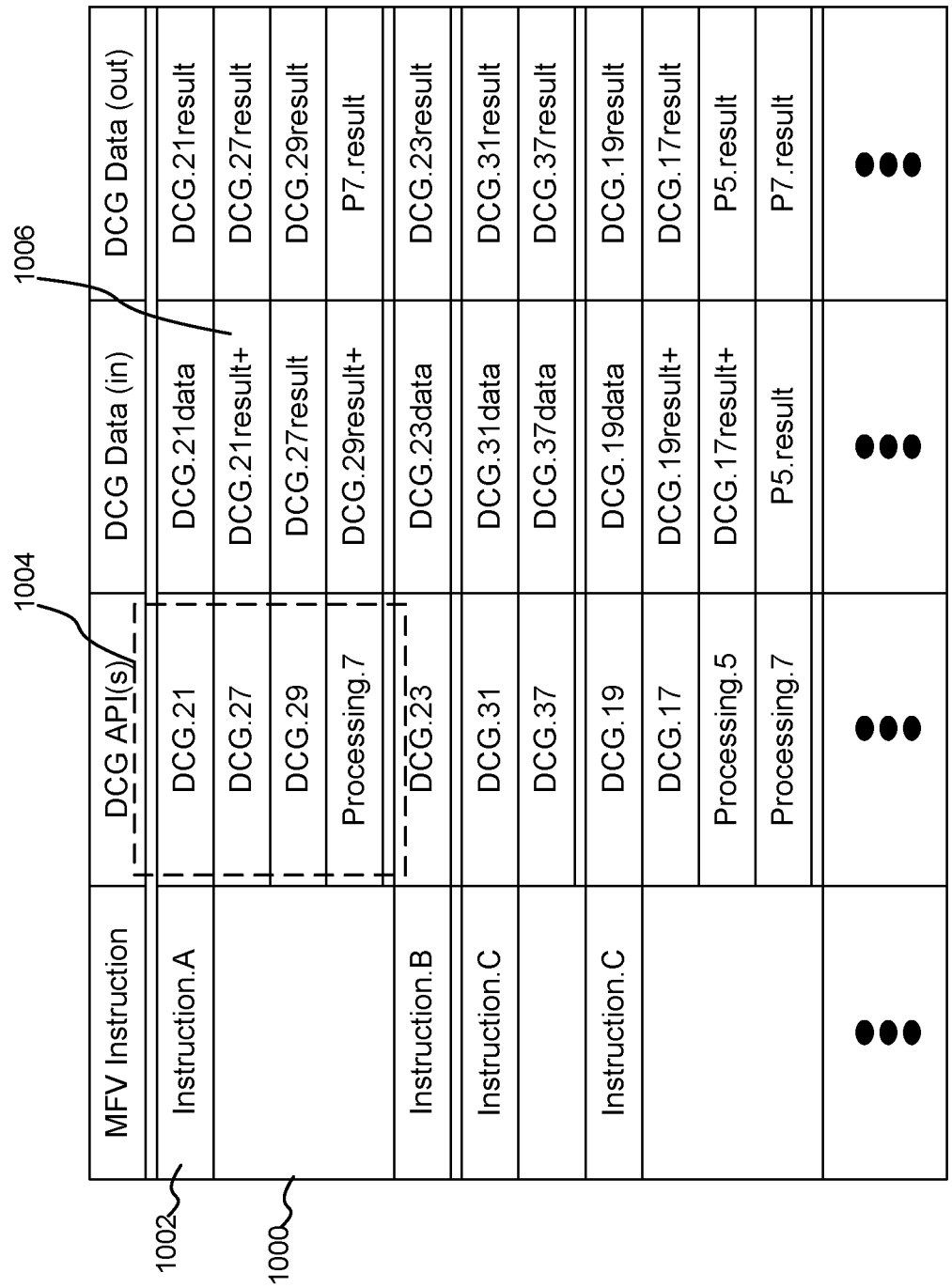
FIG. 10 is a block diagram illustrating an exemplary bridge table in accordance with aspects of the disclosed subject matter.

In regard to mapping, each bridge component, such as bridge component 216, is configured with and/or has a data set of mapping information. Turning to FIG. 10, this figure is a block diagram illustrating an exemplary bridge table 1000 of mapping information for mapping MVF instructions and data to corresponding DCG API calls as well as information from interpreting the returned data. As shown in table 1000 includes various illustrative user instructions (illustratively part of the MVF UX) that may create, manipulate, modify, and/or delete content, such as MVF Instruction.A 1002. Correspondingly, the bridge table includes a set 1004 of operations and/or functions, most of which are DCG API calls, to generate the desired, to-be-displayed content, e.g., the displayed content display view 404 of FIG. 4A. As shown, among the set 1004 of operations and functions is a Processing Tools 206 instruction, "Processing 7," that is included in the mapping configuration to complete the DCG generated display content into the desired to-be-displayed display content, per the MVF's "Instruction.A" function execution utilizing all or some of the returned data, "DCG.29result."

According to aspects of the disclosed subject matter, the illustrative operations and/or functions of "Instruction.A" 1002 is an example of a 1:2+(one to many) mapping as described earlier with respect to the bridge components. In contrast, as also shown in bridge table 1000, "MVF Instruction.B" shows a 1:1 mapping of MVF user instructions to a corresponding DCG API call, "DCG.23."

Of course, those skilled in the art will appreciate that the "Data In" and "Data Out" values are specific and complicated, and these require specific mapping(s) in order to supply the correct data in the correct format and order with the corresponding API call, and to correctly interpret the returned ("out") results. Further still, where a "+" is present, this indicates a location modification of data, often an addition of data, to the result identified as input. For example, and as shown in bridge table 1000, the execution of DCG API "DCG.29" results in "DCG.29result". However, while the location processing, "Processing.7", utilizes the results of the "DCG.29" API call, the results are modified as indicated by the "+" with "DCG.29result+."

According to aspects of the disclosed subject matter, while the illustrated mappings are shown as bridge table 1000, it will be appreciated by those skilled in the art that the mappings between the MVF UX and a corresponding DCG may be stored in a table (as illustrates by bridge table 1000), a database, and/or as specifically encoded instructions in the bridge component itself, including input data organization and arrangement, as well as output data organization and arrangement.

Figure 11:
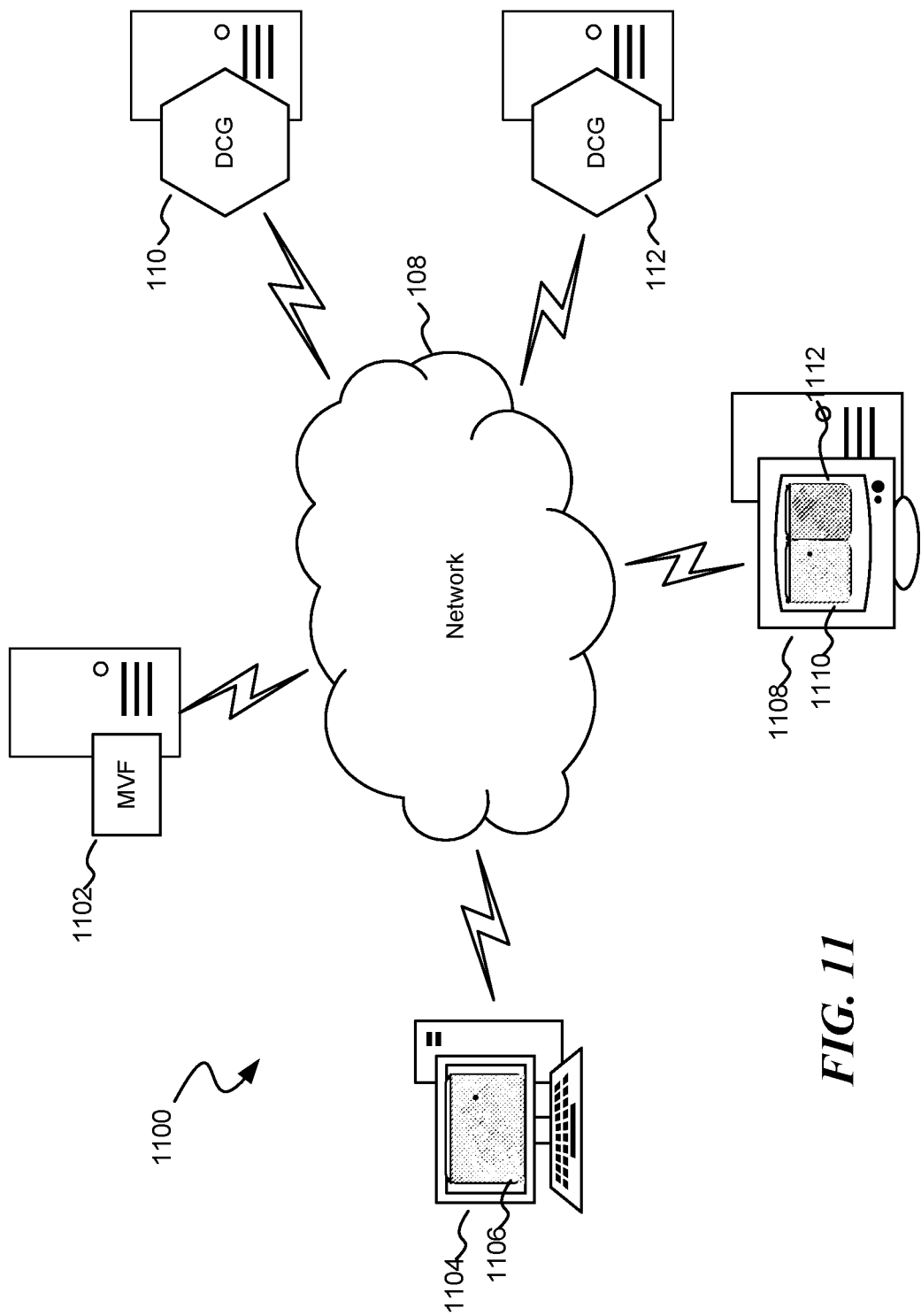
FIG. 11 is a block diagram illustrating an alternative, exemplary computer environment suitable for implementing aspects of the disclosed subject matter.

Turning to FIG. 11, this figure is a block diagram illustrating an alternative, exemplary computer environment 1100 suitable for implementing aspects of the disclosed subject matter. More particularly, computer environment 11 illustrates that an MVF, such as MVF 1102 may be configured to operate as a service, independent of a specific application that may be viewed by a computer user in viewing displayable content. Indeed, according to aspects of the disclosed subject matter, the computer environment 1100 includes two user computers, 1104 and 1108, both of which have applications running thereon and displaying content view a display view, e.g., 1106 and 1110 respectively. Additionally, each display view of the two, independently operating applications, is displaying one or more views of the same digital model, and which are synchronized according to and by the MVF 1102 operating as a service.

As suggested above, the MVF may include a synchronization manager 218 that can manage the synchronization of multiple display views of the same digital model. In these instances, the application issues commands to the MVF 1102 through regarding views to be displayed on the computer and synchronization that should occur with one or more other computers, e.g., that the display views 1106, 1110 and 1112 of applications on user computers 1104 and 1108 should be synchronized views of the same digital model. As illustrated, the display view 1106 on computer 1104 may be presenting display content from DCG 110 of a digital model, while the display view 1110 on computer 1108 may be presented display content in display views 1110 and 1112 from DCG 110 and DCG 112, respectively, of the same digital model. Indeed, according to aspects of the disclosed subject matter, multiple users may view and collaborate on their own presentation(s) of display content of a single digital model which is synchronized by the MVF, while each display may be of content of a distinct DCG.

According to aspects of the disclosed subject matter, computer and/or application specific display details such as data formatting, size, and synchronization methods may be communicated to the MVF 1102 by each application in order to ensure that display content obtained for the specific application is presentable by the application.

Figure 12:
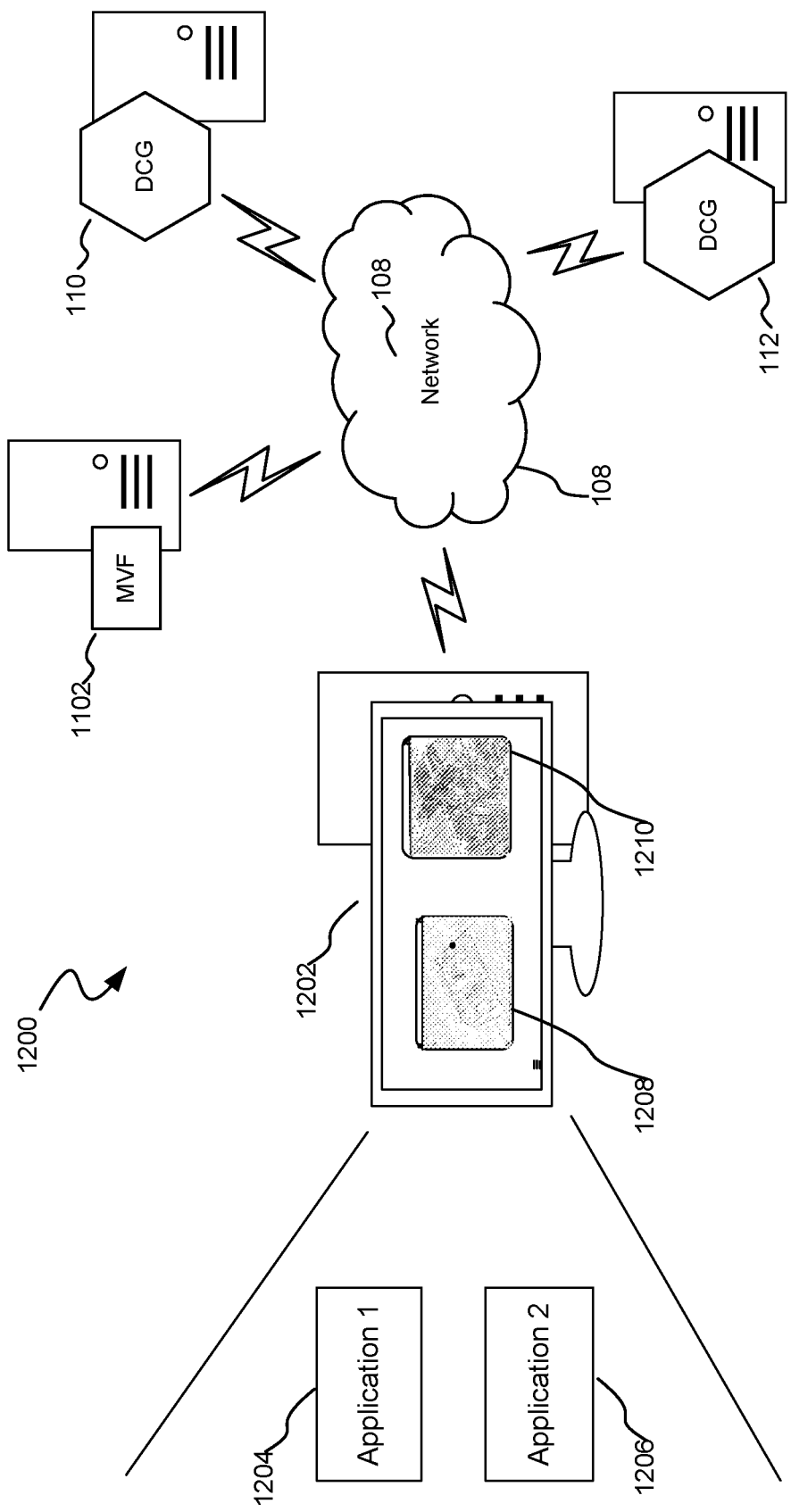
FIG. 12 is a block diagram illustration yet another alternative, exemplary computer environment suitable for implementing aspects of the disclosed subject matter.

While computer environment 1100 illustrates the MVF 1102 operating as an online service and capable of bridging communications between applications and DCGs, as well as synchronizing the content between the applications, in some embodiments an MVF operate with different applications that operate on the same computer. Turning to FIG. 12, this figure is a block diagram illustrating yet another alternative, exemplary computer environment 1200 suitable for implementing aspects of the disclosed subject matter. Indeed, two applications, Application 1 1204 and Application 2 1206, operate on user computer 1202. Each application has at least one display view: 1208 and 1210 respectively. Further and according to embodiments of the disclosed subject matter, an MVF 1102 may be synchronizing and coordinating content display between the two applications from disparate DCGs, such as DCG 110 and DCG 112, and from a remote location (operating as an online service.)

Figure 13:
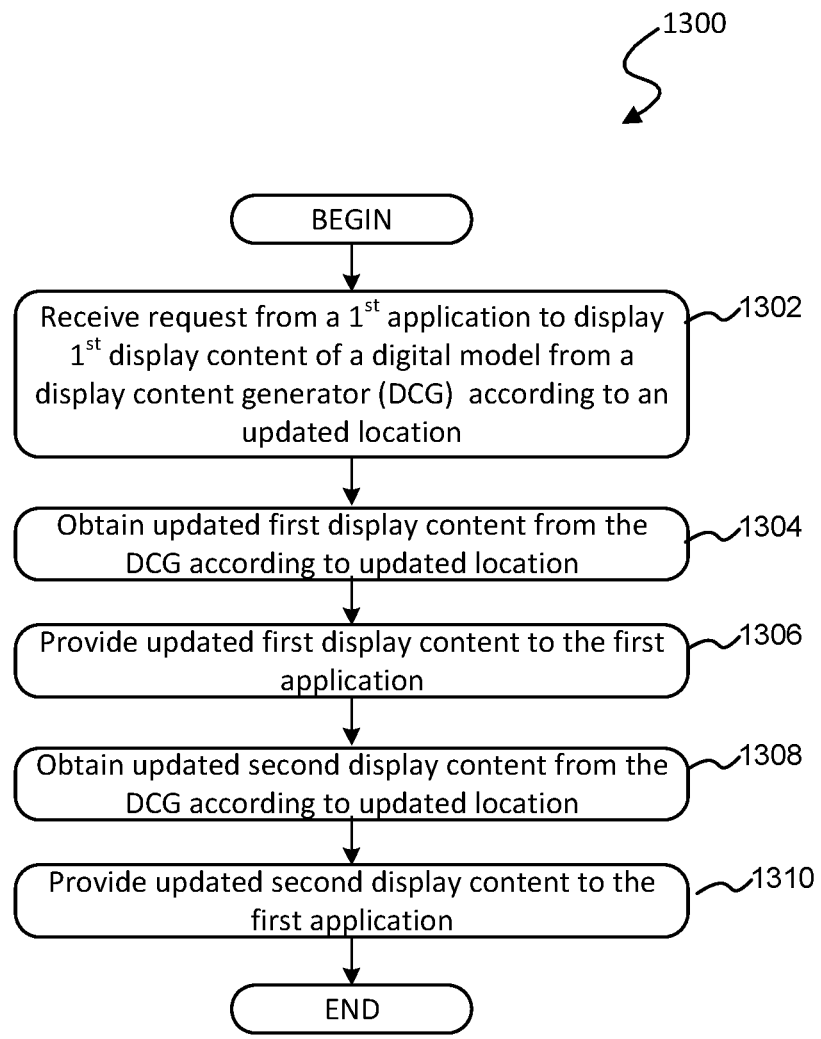
FIG. 13 is a flow diagram illustrating an exemplary routine for maintaining synchronizing data between applications (on the same or different computers).

As illustrated in FIGS. 11 and 12, in various embodiments of the disclosed subject matter, instead of the application driving the updates of the various display views, an MVF may be responsible for at least some of the updates, especially as the MVF maintains synchronization across computers and/or across applications. Turning to FIG. 13, this figure is a flow diagram illustrating an exemplary routine 1300 for maintaining synchronizing data between applications (on the same or different computers). Beginning at block 1302, an MVF, such as MVF 1102 of FIGS. 11 and 12, receives an instruction from a first application to update a current location and obtain first updated display content for the first application. At block 1304, the MVF obtains the updated first display content, based on the updated location, from the DCG(s) providing display content (via the bridge(s) utilized on behalf of the first application) to the first application. At block 1306, the updated first display content is provided to the first application.

At block 1308 and as part of a synchronization directive between the first and second applications, the MVF obtains updated second display content, based on the updated location, from the DCG(s) providing display content, again via bridge(s) utilized on behalf of the second application, to the second application. In other words, at block 1306, the MVF automatically synchronizes the second application according to the actions (in this case an updated location) of the first location. At block 1310, the updated second display content is provided to the first application. Thereafter, the synchronization terminates.

While the above description of a multi-view framework (MVF) synchronizing, bridging, coordinating views of disparate, third-party DCGs through a single UX has been made largely in regard to geographic locations and areas, it should be appreciated that the various aspects of and embodiments of an MVF, which bridges an application with third-party display content generators (DCGs), as described above may be suitably applied to numerous other uses. These other uses may include, by way of illustration and not limitation, building examination including layouts of plumbing, electrical and/or air conditioning, displaying various content views of a virion (e.g., a SARS-COVID-19 virion) and/or a cluster of virions, biological systems, logical arrangements of data and data structures, and the like.

While various novel aspects of the disclosed subject matter have been described, it should be appreciated that these aspects are exemplary and should not be construed as limiting. Variations and alterations to the various aspects may be made without departing from the scope of the disclosed subject matter.

The invention claimed is:

1. A method for operating a display framework, the method comprising the following as implemented on a computing device having a display upon which a plurality of views may be displayed, the method comprising:
    receiving a first request for first display content corresponding to a location value;
    identifying a first display content generator that generates the first display content, wherein the first display content generator is a third-party service to the display framework;
    selecting an executable first bridge module from a plurality of bridge modules to bridge communications between the display framework and the first display content generator, and executing the first bridge module, wherein the first bridge module is specifically configured to bridge communications between the display framework and the first display content generator;
    obtaining first display content corresponding to the location value from the first display content generator via the first bridge module and displaying the first display content in a first view on the display;
    receiving a second request for second display content corresponding to the location value;
    identifying a second display content generator that generates the second display content, wherein the second display content generator is a third-party service to the display framework;
    selecting an executable second bridge module from the plurality of bridge modules to bridge communications between the display framework and the second display content generator, and executing the second bridge module, wherein the second bridge module is specifically configured to bridge communications between the display framework and the second display content generator, and wherein the second bridge module is not configured to bridge communications between the display framework and the first display content generator;
    obtaining second display content corresponding to the location value from the second display content generator via the second bridge module and displaying the second display content in a second view on the display, wherein the first view and the second view are displayed concurrently on the display;
    receiving an update to the location value, and in response:
        communicating the updated location value to both the first display content generator via the first bridge module and the second display content generator via the second bridge module;
        receiving updated first display content corresponding to the updated location value from the first display content generator via the first bridge module and displaying the updated first display content in the first view on the display; and
        receiving updated second display content corresponding to the updated location value from the second display content generator via the second bridge module and displaying the updated second display content in the second view on the display, wherein the first view and the second view are displayed concurrently on the display.

2. The method of claim 1, wherein the method further comprises formatting display content from the first display content generator by the first bridge module, including the first display content and the updated first display content, to a format suitable for display in the first view on the display.

3. The method of claim 1, wherein the first bridge component is specifically configured to bridge communications between the display framework and the first display content generator via an application programming interface (API) of the first display content generator.

4. The method of claim 3, wherein the second bridge component is specifically configured to bridge communications between the display framework and the second display content generator via an application programming interface of the second display content generator; and
    wherein the API of the first display content generator and the API of the second display content generator are not the same.

5. The method of claim 1, wherein the update to the location value is initiated by interaction with an actionable element of the first display content or interaction with an actionable element of the second display content.

6. The method of claim 1, wherein the location value includes a geographic location, a view perspective, and a view orientation.

7. The method of claim 6, wherein the update to the location value is initiated by interaction with an actionable element of the first display content or interaction with an actionable element of the second display content.

8. The method of claim 6, further comprising displaying a first location indicator in the first view displaying the first display content at a position corresponding to the location view.

9. The method of claim 8, further comprising redisplaying the first location indicator in the first view displaying the updated first display content at a position corresponding to the updated location view.

10. The method of claim 8, further comprising displaying a second location indicator in the second view displaying the second display content at a position corresponding to the location view.

11. The method of claim 10, further comprising redisplaying the second location indicator in the second view displaying the updated second display content at a position corresponding to the updated location view.

12. A method for operating a display framework on a computing device having a display upon which a plurality of views is presented, the method comprising:
- receiving a first instruction to display first display content corresponding to a location value from a first display content generator in a view on the display, wherein the first display content generator is a third-party service to the display framework;
- selectively identifying a first communication bridge from a plurality of communication bridges, the first communication bridge suitably configured to facilitate communications between the first display content generator and the display framework;
- obtaining first display content corresponding to the location value from the first display content generator via the first communication bridge and transforming the first display content to first formatted display content in a format suitable for display by the display framework, and displaying the first formatted display content in a first view on the display;
- receiving a second instruction to display second display content corresponding to the location value from a second display content generator in a view on the display, wherein the second display content generator is a third-party service to the display framework and to the first display content generator;
- selectively identifying a second communication bridge from the plurality of communication bridges, the second communication bridge suitably configured to facilitate communications between the second display content generator and the display framework;
- obtaining second display content corresponding to the location value from the second display content generator via the second communication bridge, and displaying the second display content in a second view on the display;
- receiving an update to the location value, and in response:
- communicating the updated location value to the first display content generator via the first communication bridge, and communicating the updated location value to the second display content generator via the second communication bridge;
- receiving updated first display content corresponding to the updated location value from the first display content generator, formatting the updated first display content via the first communication bridge for display by the framework on the display, and displaying the formatted updated first display content in the first view on the display; and
- receiving updated second display content corresponding to the updated location value from the second display content generator via the second communication bridge, and displaying the updated second display content in the second view on the display;
- wherein the first view displaying the formatted updated first display content and the second view displaying the updated second display content are displayed concurrently on the display.

13. The method of claim 12, wherein the first instruction to display first display content includes information for including one or more of coloring, shading and/or patterning to one or more features of the first display content.

14. The method of claim 13, wherein the first instruction to display first display content includes information for including a user-actionable control associated with a feature of the first display content.

15. The method of claim 14, wherein the user-actionable control is configured to cause an additional instruction to be executed by the display framework when activated by a user.

16. A computer-implemented method for maintaining synchronization as to a location of display content of at least two display content generators on a display framework, the method comprising:
- receiving an instruction at the display framework to obtain first display content corresponding to a location value from a first display content generator, wherein the first display content generator is a third-party service to the display framework;
- selectively identifying a first communication bridge from a plurality of executable communication bridges, the first communication bridge, in execution, being suitably configured to facilitate communications between the first display content generator and the display framework;
- obtaining first display content corresponding to the location value from the first display content generator via the first communication bridge, and displaying the first display content in a first display view on a display;
- receiving an instruction at the display framework to obtain second display content corresponding to the location value from a second display content generator, wherein the second content generator is a third-party service to the display framework, and wherein the first display content generator and the second display content generator are not the same;
- selectively identifying a second communication bridge from the plurality of executable communication bridges, the second communication bridge, in execution, being suitably configured to facilitate communications between the second display content generator and the display framework;
- obtaining second display content corresponding to the location value from the second display content generator via the second communication bridge, wherein the second display content is of a format that is not displayable by the display framework;
- formatting the second display content to a format suitable for display by the display framework via the second display bridge and displaying the second formatted display content in a second view on the display;

receiving an update to the location value, and in response:

communicating the updated location value to the first display content generator via the first communication bridge, and communicating the updated location value to the second display content generator via the second communication bridge;

receiving updated first display content corresponding to the updated location value from the first display content generator via the first communication bridge, and displaying the updated first display content in the first view;

receiving updated second display content corresponding to the updated location value from the second display content generator via the second communication bridge;

formatting the updated second display content to a format suitable for display by the display framework via the second display bridge; and receiving the formatted updated second display content at the display framework and displaying the formatted updated second display content in the second view to maintain location synchronization between the first view and the second view.

17. The method of claim 16, further comprising formatting the first display content via the first communication bridge and providing the formatted first display content to the display framework according to a format suitable for presentation by the display framework.

18. The method of claim 16, wherein the first display content includes one or more of shading, coloring, and patterning on one or more features of the first display content.

19. The method of claim 16, wherein an application programming interface (API) for instructing the first display content generator to generate display content for display by the display framework is not the same as an API for instructing the second display content generator to generate display content for display by the display framework.

* * * * *